(12) United States Patent
Rohlfs

(10) Patent No.: US 11,107,160 B2
(45) Date of Patent: Aug. 31, 2021

(54) REFERENTIAL DATA STRUCTURES FOR AUTOMATICALLY UPDATING ASSET ATTRIBUTES IN REAL TIME BASED ON STREAMING DATA

(71) Applicant: DEARBORN FINANCIAL, INC., St. Charles, IL (US)

(72) Inventor: Michael B. Rohlfs, Northbrook, IL (US)

(73) Assignee: DEARBORN FINANCIAL, INC., St. Charles, IL (US)

( * ) Notice: Subject to any disclaimer, the term of this patent is extended or adjusted under 35 U.S.C. 154(b) by 0 days.

(21) Appl. No.: 17/069,336

(22) Filed: Oct. 13, 2020

(65) Prior Publication Data

US 2021/0027377 A1   Jan. 28, 2021

(51) Int. Cl.
| | |
|---|---|
| *G06Q 40/04* | (2012.01) |
| *G06F 16/242* | (2019.01) |
| *G06F 16/2455* | (2019.01) |
| *G06F 21/62* | (2013.01) |
| *G06F 16/22* | (2019.01) |
| *G06F 16/27* | (2019.01) |
| *G06F 21/34* | (2013.01) |
| *G06F 16/23* | (2019.01) |

(52) U.S. Cl.
CPC ......... *G06Q 40/04* (2013.01); *G06F 16/2282* (2019.01); *G06F 16/2379* (2019.01); *G06F 16/2435* (2019.01); *G06F 16/24568* (2019.01); *G06F 16/278* (2019.01); *G06F 21/34* (2013.01); *G06F 21/6209* (2013.01)

(58) Field of Classification Search
USPC .......................................................... 707/705
See application file for complete search history.

(56) References Cited

U.S. PATENT DOCUMENTS

| | | |
|---|---|---|
| 7,797,225 B1 | 9/2010 | Kemp et al. |
| 8,046,286 B2 | 10/2011 | Chorna et al. |
| 9,002,741 B2 | 4/2015 | Rohlfs |
| 9,460,470 B2 | 10/2016 | Rohlfs |
| 10,269,070 B2 | 4/2019 | Rohlfs |
| 2002/0198817 A1 | 12/2002 | Dhir |

(Continued)

OTHER PUBLICATIONS

International Search Report and Written Opinion received for the PCT Application No. PCT/US2014/032976, dated Aug. 27, 2014, 9 pages.

(Continued)

*Primary Examiner* — Muluemebet Gurmu

(57) ABSTRACT

A server connected to a network generates a database including a first data structure configured to store attributes of fungible assets, where the attributes determine market values of the fungible assets, and a second data structure having fields referentially related to the attributes stored in the first data structure such that a change in any one of the fields induces a change in real time in a corresponding attribute in the first data structure. The server receives a stream of data regarding one or more of the attributes of the fungible assets from the network, which modifies one or more of the fields of the second data structure, and which allows at least one of cycling, liquidating, and replenishing of one or more of the fungible assets while maintaining a relative value equivalence of the fungible assets.

23 Claims, 12 Drawing Sheets

(56) References Cited

U.S. PATENT DOCUMENTS

| | | |
|---|---|---|
| 2007/0038551 A1 | 2/2007 | Shah |
| 2008/0027847 A1 | 1/2008 | Masucci |
| 2008/0033833 A1 | 2/2008 | Senior |
| 2008/0243668 A1* | 10/2008 | Ondyak ............. G06Q 30/0283 |
| | | 705/37 |
| 2011/0153492 A1 | 6/2011 | Gainor et al. |
| 2013/0036039 A1* | 2/2013 | Rohlfs .................. G06Q 40/04 |
| | | 705/37 |
| 2013/0036071 A1 | 2/2013 | Rouwenhorst et al. |
| 2015/0221022 A1 | 8/2015 | Gu et al. |
| 2015/0221032 A1* | 8/2015 | Rohlfs .................. G06Q 40/04 |
| | | 705/37 |
| 2015/0278915 A1* | 10/2015 | Dedhia ............. G06F 16/90335 |
| | | 705/26.7 |
| 2017/0061540 A1 | 3/2017 | Rohlfs |
| 2018/0068359 A1 | 3/2018 | Preston et al. |
| 2018/0285957 A1* | 10/2018 | Ng ......................... G06N 5/003 |
| 2019/0095995 A1* | 3/2019 | Rohlfs ................. G06Q 20/389 |

OTHER PUBLICATIONS

Restriction Requirement received for the U.S. Appl. No. 16/205,511, dated Aug. 2, 2019, 5 pages.

Non-Final Office Action received for the U.S. Appl. No. 16/205,511, dated Sep. 13, 2019, 16 pages.

Final Office Action received for the U.S. Appl. No. 16/205,511, dated Jan. 3, 2020, 16 pages.

Non-Final Office Action received for the U.S. Appl. No. 16/205,511, dated Apr. 29, 2020, 15 pages.

* cited by examiner

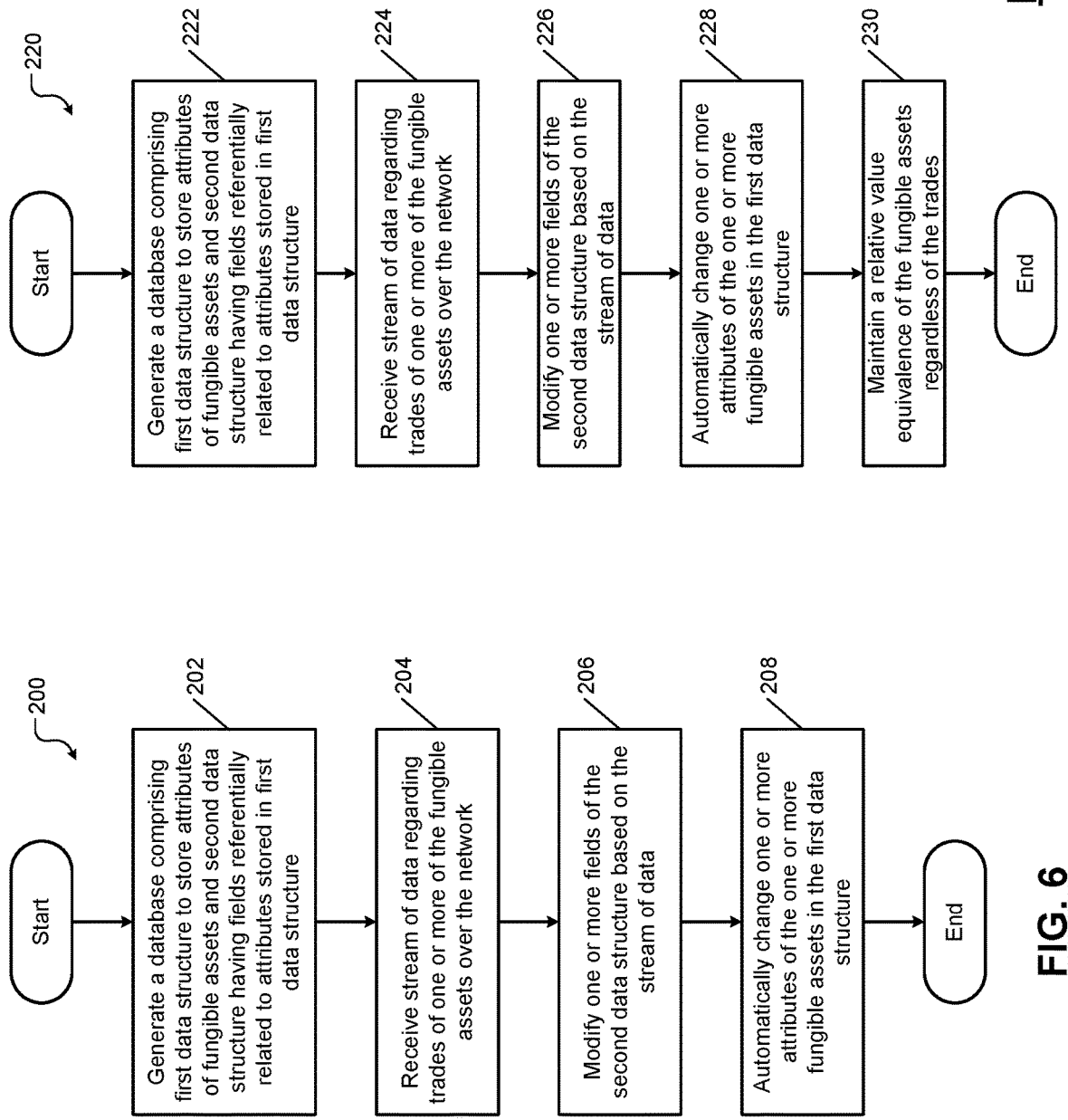

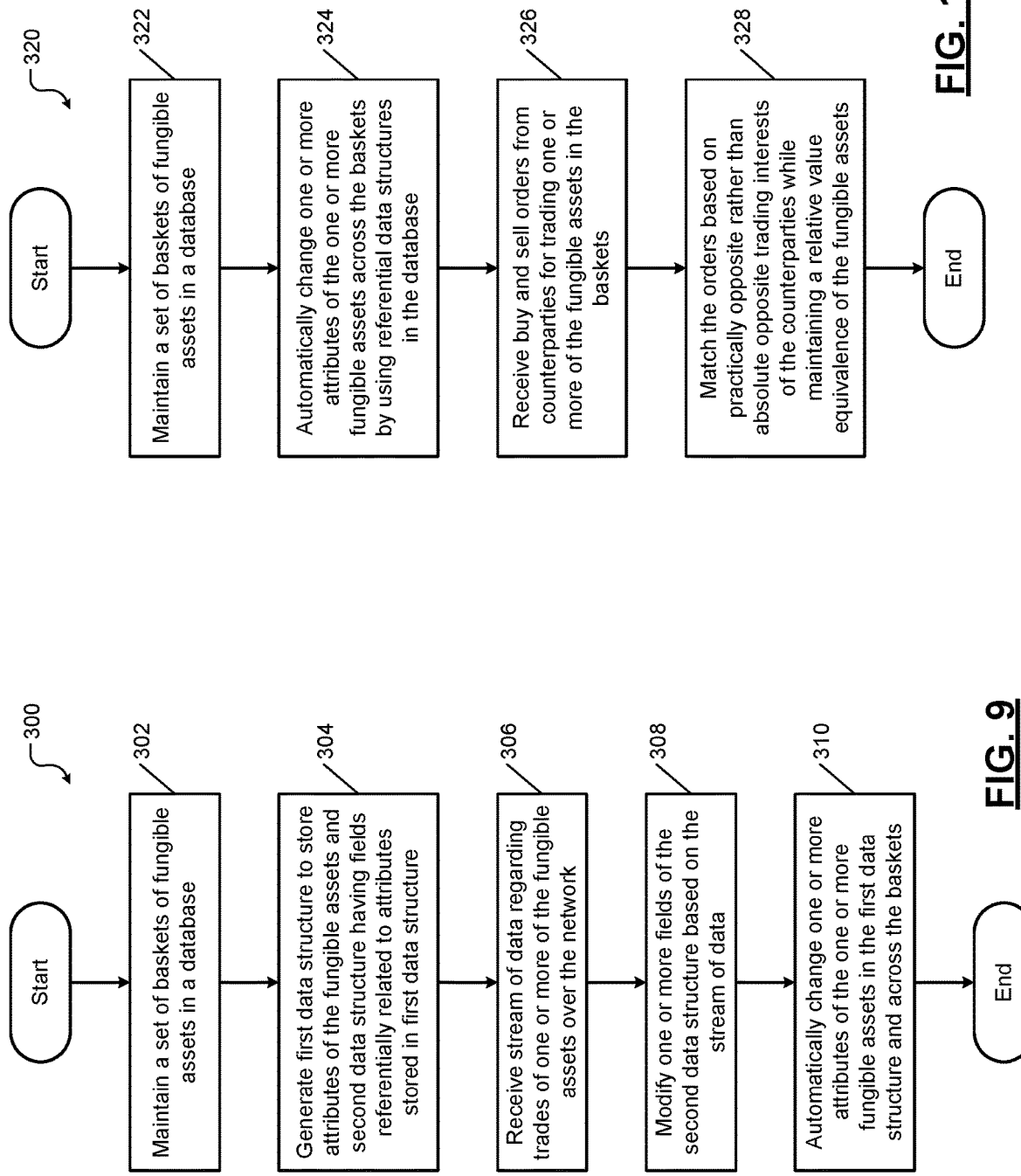

| Global e-Bourse Suites Trading Platforms and Products | Global Commodities Related | | | Global Credit | Global | DABMoE |
|---|---|---|---|---|---|---|
| | e-Bourses | e-Souks | e-Counter | e-Bourses | d-Bourse* | Exchange |
| Instruments linked to WAB sets: | | | | | | |
| - conventional-style futures contracts designed for standalone trading and settled financially; in certain cases, pre-qualified customers can exchange their net open futures positions for forward contracts | X | | | | | |
| - spot and forward contracts settled via physical delivery/receipt and formulated for co-settlement with synergistic CDI and FPDDI contracts | | X | X | X | X | |
| - Repurchase Agreements ("Repos") backed by assets being financed | X | X | | X | X | |
| - ABETB: sets of physically tradable assets that emulate WAB's linked to ETD contracts, in each case underpinned by qualifying fungible assets with quantitative, qualitative, logistics and settlement timing differentials | X | X | X | X | X | |
| - ABMoE: sets of ABETB's formulated *inter alia* for use at Global e-Counter | X | | X | X | X | |
| - DABMoE: securitized and tokenized ABMoE underpinning cryptocurrencies | | | | | X | X |
| CDI and FPDDI contracts structured as: | | | | | | |
| - conventional futures settled financially, available for standalone trading | X | | | X | | |
| - financially settled instruments providing equilibrium to WAB-linked spots and forwards based on algorithms (and related pop-up screens) determining requisite quantities, long and/or short, needed to effectuate operative Exchange-specified physical asset co-settlement | X | X | X | X | X | |
| - instruments that are also designed to consistently maintain relative value equivalence for each asset underpinning a Repo, ABETB, ABMoE and DABMoE, plus Exchange managed and controlled inventories established to help cycle qualifying assets in and out of ABETB | | X | X | X | X | X |

* Global d-Bourse
 - serves as a liquidity provider engaged in BCS-based matching of practically opposite assets underlying physically-settled WAB Set ETD contracts
 - serves as an automated market data provider of continuously updated standalone and BCS-based "all-in" bids, offers and executed orders for WAB, CDI and FPDDI contracts, as well as for ABETB, ABMoE and DABMoE, thereby facilitating efficient price discovery
 - serves as a provider of BCS-based algorithms applied to the forgoing, the net cumulative effects of which transform standalone WAB Set contracts to "all-in" market price indications for respective assets qualifying as underlying members of (i) ABETB and (ii) inventories managed and controlled to meet Exchange Affiliates-wide commitments for physically settled spot, forward, and ABETB asset-cycling transactions

FIG. 15

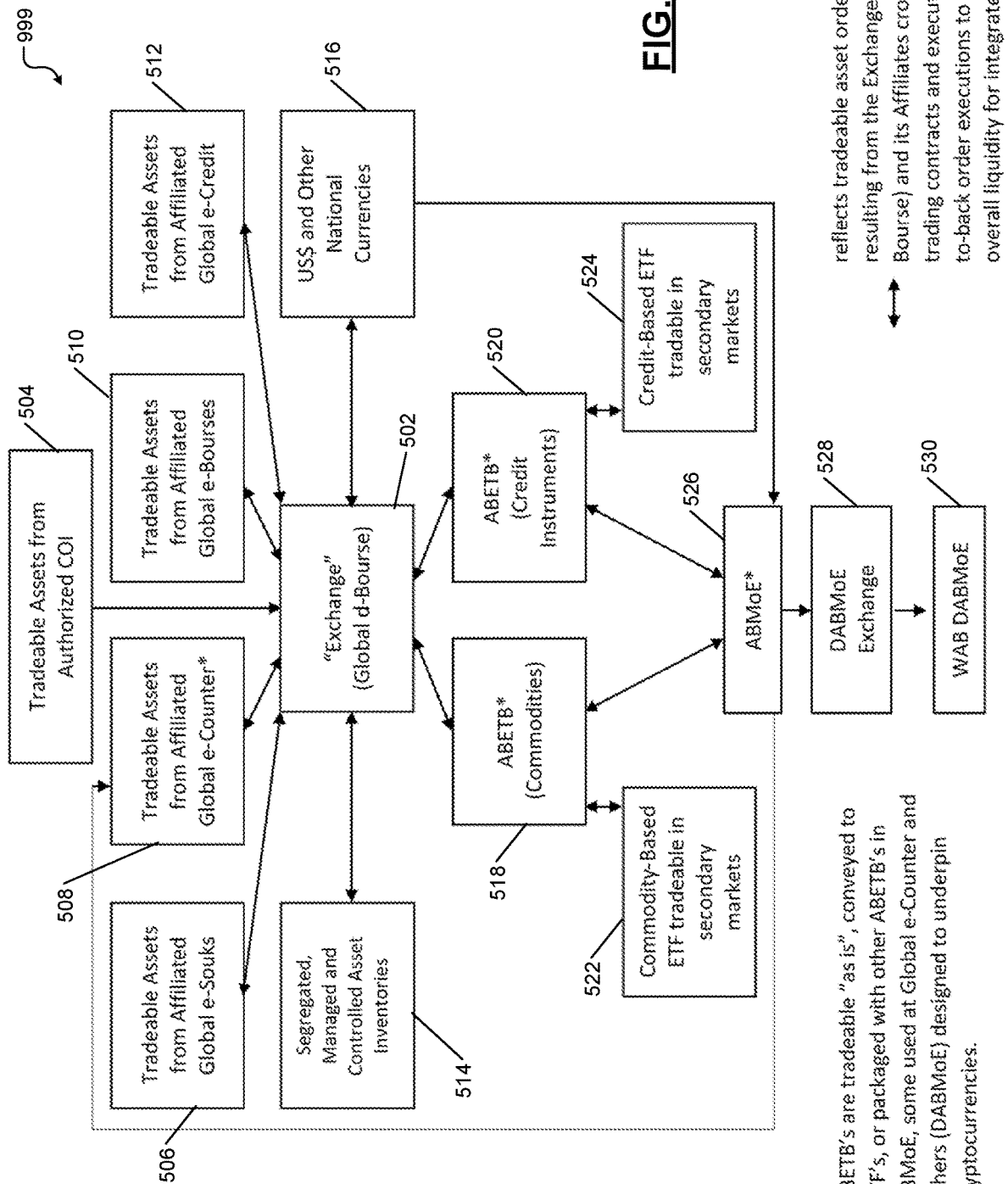

REFERENTIAL DATA STRUCTURES FOR AUTOMATICALLY UPDATING ASSET ATTRIBUTES IN REAL TIME BASED ON STREAMING DATA

CROSS-REFERENCE TO RELATED APPLICATIONS

The present disclosure is related to the following U.S. patents and patent application publication: U.S. Pat. No. 10,510,115 issued Dec. 17, 2019 titled Computerized Exchange-Controlled Network System and Related Method; U.S. Pat. No. 10,269,070 issued Apr. 23, 2019 titled System and Method for Sharia-based Market Hedging and Related Method; U.S. Pat. No. 9,460,470 issued Oct. 4, 2016 titled System and Market Hedging and Related Method; U.S. Pat. No. 9,002,741 issued Apr. 7, 2015 also titled System and Market Hedging and Related Method; U.S. Pat. No. 9,741,042 issued Aug. 22, 2017 titled Global Pollution Control System Employing Hybrid Incentive Trade Instruments and Related Method of Establishing Market Values, which is related in part to U.S. Pat. No. 8,722,002 issued May 13, 2014 titled System for Recycling Captured Agglomerated Diesel Soot and Related Methods; and U.S. Patent Application Publication No. 2019/0095995 published Mar. 28, 2019 titled Systems and Methods for Operating Exchange Controlled Network Handling Digitized Asset-Backed Medium of Exchange. The entire disclosures of the U.S. patents and the patent application publication referenced above are incorporated herein by reference.

FIELD

The present disclosure relates to referential data structures for automatically updating asset attributes in real time based on streaming data cross-reference to related applications.

BACKGROUND

The background description provided here is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY

A server connected to a network comprises a processor and memory storing instructions which when executed by the processor configure the processor to generate a database. The database comprises a first data structure configured to store attributes of fungible assets. The attributes determine market values of the fungible assets. The database comprises a second data structure having fields referentially related to the attributes stored in the first data structure such that a change in any one of the fields induces a change in real time in a corresponding one of the attributes in the first data structure. The instructions configure the processor to receive a stream of data regarding one or more of the attributes of the fungible assets from the network, and to modify one or more of the fields of the second data structure based on the stream of data received from the network. The instructions configure the processor to allow at least one of cycling, liquidating, and replenishing of one or more of the fungible assets associated with the first data structure based on the modified one or more fields of the second data structure. The instructions configure the processor to maintain a relative value equivalence of the fungible assets based on the at least one of cycling, liquidating, and replenishing of the one or more of the fungible assets associated with the first data structure.

In other features, the first data structure is automatically updated in real time as the stream of data modifies the one or more of the fields of the second data structure, and the updating of the first data structure automatically updates the attributes and valuations of the fungible assets in real time.

In other features, the attributes of the fungible assets include an asset type, valuation data, and geographic data of the fungible assets.

In another feature, the stream of data is based on trading activity associated with the one or more of the fungible assets over the network.

In other features, the instructions further configure the processor to maintain a plurality of baskets of the fungible assets in the database, and modifying the one or more of the fields of the second data structure automatically updates the attributes and valuations of the fungible assets across the baskets in real time.

In other features, the instructions further configure the processor to receive via the network buy and sell orders from counterparties for trading one or more of the fungible assets in the baskets and to match the orders based on practically opposite rather than absolute opposite trading interests of the counterparties while maintaining the relative value equivalence of the fungible assets in the baskets.

In other features, the instructions further configure the processor to generate a weighted average benchmark based on a plurality of asset forms of one or more of the fungible assets and to match the orders using the weighted average benchmark.

In other features, the instructions further configure the processor to provide liquidity and physical delivery of the traded fungible assets to the counterparties via the network upon matching the orders while maintaining the relative value equivalence of the fungible assets in the baskets.

In another feature, the instructions further configure the processor to align the orders to comply with Sharia law.

In another feature, the instructions further configure the processor to generate a digitized medium of exchange that is based on a set of baskets comprising the fungible assets and that is usable for trading the fungible assets over the network.

In another feature, the instructions further configure the processor to securitize and tokenize the digitized medium of exchange for trading the fungible assets over the network.

In another feature, the server further comprises a dongle that cryptographically authenticates access to the server via the network and that secures data transfers between the server and the network.

In another feature, the server further comprises a dongle that provides transformational data protection via encryption that adds authentication and fault tolerant information to data transfers between the server and the network.

In still other features, a method comprises generating a database on a server. The database comprises a first data structure configured to store attributes of fungible assets. The attributes determine market values of the fungible assets. The database comprises a second data structure having fields referentially related to the attributes stored in the first data structure such that a change in any one of the fields induces a change in real time in a corresponding one of the attributes in the first data structure. The method comprises receiving a stream of data regarding one or more of the attributes of the fungible assets at the server from a network, and modifying one or more of the fields of the second data structure based on the stream of data received from the network. The method comprises allowing at least one of cycling, liquidating, and replenishing of one or more of the fungible assets associated with the first data structure based on the modified one or more fields of the second data structure. The method comprises maintaining a relative value equivalence of the fungible assets based on the at least one of cycling, liquidating, and replenishing of the one or more of the fungible assets associated with the first data structure.

In other features, the method further comprises automatically updating the first data structure in real time as the stream of data modifies the one or more of the fields of the second data structure, and automatically updating, based on the updating of the first data structure, the attributes and valuations of the fungible assets in real time.

In other features, the attributes of the fungible assets include an asset type, valuation data, and geographic data of the fungible assets.

In another feature, the method further comprises receiving the stream of data in response to trading activity associated with the one or more of the fungible assets over the network.

In other features, the method further comprises maintaining a plurality of baskets of the fungible assets in the database, and automatically updating, based on the modifying of the one or more of the fields of the second data structure, the attributes and valuations of the fungible assets across the baskets in real time.

In other features, the method further comprises receiving, at the server via the network, buy and sell orders from counterparties for trading one or more of the fungible assets in the baskets, and matching, at the server, the orders based on practically opposite rather than absolute opposite trading interests of the counterparties while maintaining the relative value equivalence of the fungible assets in the baskets.

In other features, the method further comprises generating a weighted average benchmark based on a plurality of asset forms of one or more of the fungible assets, and matching the orders using the weighted average benchmark.

In other features, the method further comprises providing liquidity and physical delivery of the traded fungible assets to the counterparties via the network upon matching the orders while maintaining the relative value equivalence of the fungible assets in the baskets.

In another feature, the method further comprises aligning the orders to comply with Sharia law.

In another feature, the method further comprises generating, at the server, a digitized medium of exchange that is based on a set of baskets comprising the fungible assets and that is usable for trading the fungible assets over the network.

In other features, the method further comprises securitizing and tokenizing, at the server, the digitized medium of exchange for trading the fungible assets over the network.

In another feature, the method further comprises cryptographically authenticating access to the server via the network and securing data transfers between the server and the network by using a dongle coupled to the server.

In another feature, the method further comprises providing transformational data protection via encryption and adding authentication and fault tolerant information to data transfers between the server and the network by using a dongle coupled to the server.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 6 shows a flowchart of a method performed by the ABETB-centric order matching system for automatically updating attributes of fungible assets according to the present disclosure;

FIG. 7 shows a flowchart of a method performed by the ABETB-centric order matching system for maintaining a relative value equivalence of the fungible assets according to the present disclosure;

FIG. 9 shows a flowchart of a method performed by the ABETB-centric order matching system for automatically updating attributes of fungible assets across a set of baskets comprising the fungible assets according to the present disclosure;

FIG. 10 shows a flowchart of a method performed by the ABETB-centric order matching system for matching buy and sell orders according to the present disclosure;

FIG. 15 shows multiple dimensions impacting data structures developed around BCS-based hybrid paradigm according to the present disclosure; and FIG. 16 shows operations of the ABETB-centric order matching system performed by an exchange (i.e., by a server at the exchange; e.g., the server of FIGS. 3-5) in an ABETB-centric order matching system 500 according to the present disclosure.

In the drawings, reference numbers may be reused to identify similar and/or identical elements.

DETAILED DESCRIPTION

Figure 1A:
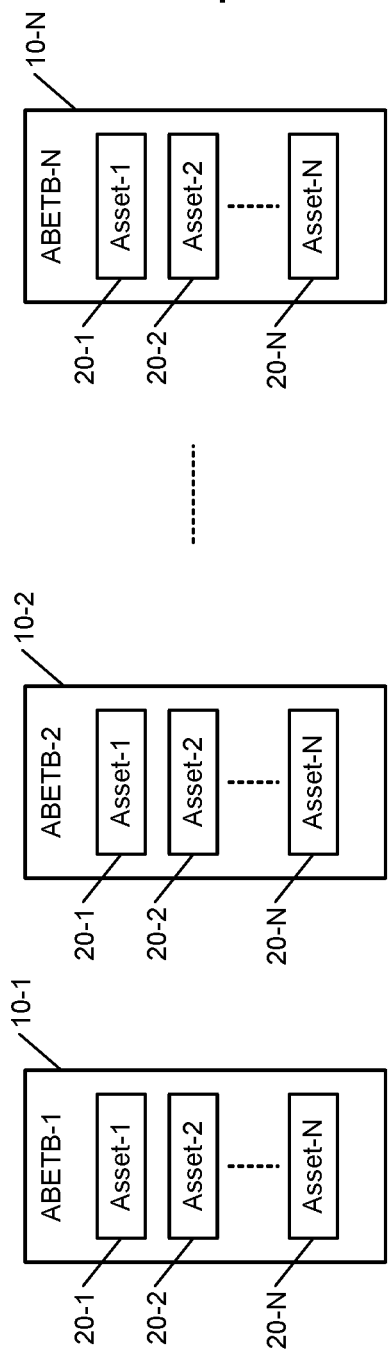
FIGS. 1A and 1B show an example of Asset-Backed Exchange Traded Baskets (ABETB's) for an ABETB-centric order matching system according to the present disclosure.

The following abbreviations and definitions are used throughout the present disclosure.

GLEBS: Global e-Bourse Suites, is an organization of affiliated exchanges whose computerized trading platforms are uniquely integrated according to the teachings of U.S. Pat. No. 10,510,115, which is incorporated herein by reference in its entirety.

ABETB: Asset-Backed Exchange Traded Baskets, are investment products with meaningful prospects in their own right, are structured inter alia to serve as major drivers of tradable asset liquidity throughout multiple markets targeted by Global e-Bourse Suites ("GLEBS").

BCS: Benchmark Complex Solutions (as disclosed in U.S. Pat. Nos. 9,002,741, 9,460,470, and 10,269,070; and in U.S. patent application publication 20190095995) result in matching practically opposite orders for fungible-yet varying tradable assets that would otherwise be victims of illiquidity inherent to absolute opposite matching.

ABMoE: Asset-Backed Medium of Exchange comprising sets of ABETB.

DABMoE: Digitized Asset-Backed Medium of Exchange

ECN: Exchange-Controlled Network

ETD: Exchange Traded Derivatives

ETF: Exchange-Traded Funds

EFP: Exchange for Physical

FPDDI: Forward Point Delivery Differential Index

CDI: Complementary Differential Index

COI: Communities of Interest

CPL: Customized Permissioned Ledger

WAB: Weighted Average Benchmark

NAV: Net Asset Value

CUspCF: Commodity User posts bid data for specific commodity form

Repos: Repurchase Agreements

All-in: A function of price discovery mechanisms whereby each fungible-yet-varying asset qualifying as a member of an ABETB is valued on the basis of its operative WAB contact price±the net price effects of its requisite number of long or short CDI and FPDDI contracts specified by the exchange as called for under the circumstances. Each time a bid, offer or executed price is reported by the Exchange's automated market data provider for any of the forgoing contracts, an updated all-in market price indication is provided for each qualifying member. The net sum of the updated all-in prices attributable to the various qualifying members then equals the updated market value of the operative WAB, after giving effect to the respective Exchange-specified weighting attributes attendant to each of its contents.

Overview of present disclosure: The present disclosure relates to an ABETB-centric order matching system that uses synergy created by a computer implemented hybrid paradigm leveraging multi-market price discoveries to optimize all-in BCS-based price liquidity achieved over a plurality of trading platforms integrated via an ECN that connects an organization of Affiliated Exchanges, their customers, and COI.

ABETB holders can gain connectivity and liquidity when the exchanges uniformly employ systems, methods, and instruments that work together to contemporaneously maintain macro level NAV equilibrium as cross-listed trading contracts attendant to qualifying fungible-yet-varying assets underpinning an Exchange-specified basket, formulated to emulate a WAB Set, are exposed to continuous micro level price fluctuations throughout each trading day.

Central to these processes are continuously updated bids, offers, and latest execution prices provided as part of a graphical user interface (GUI) data feed offered by the Exchange's automated market data provider to ECN-authenticated customers, at which point those customers may use said data to place new orders. The GUI data feed includes prices posted for Exchange-specified WAB, CDI, and FPDDI contracts, as well as for pro-forma all-in market value indications, compiled therefrom, for products that emulate BCS-based WAB Sets: e.g., ABETB representing the sum of its qualified underlying assets; and the sum of ABETB sets underpinning an Exchange-formulated ABMoE or DABMoE.

Pro-forma all-in market value indications are by-products of computer implemented algorithmic formulas applied to each of the hybrid paradigm's compendium of physical, financialized, and digitized assets when they are being bought, sold, financed, hedged, cycled (e.g., physically exchanged between ABETB's and Exchange managed/controlled inventories), securitized, and tokenized over Affiliated Exchange trading platforms. Having the ability to apply the algorithms to pluralities of assets and trading platforms creates iterative opportunities for liquidity gains to take hold symbiotically throughout the Affiliated Exchange organization, culminating in growth of physically-settled transactions whereby counterparties' practically, rather than absolute, opposite trading interests can be matched directly over one platform or via back-to-back order executions employing multiple markets and platforms.

Enabling ABETB, ABMoE, and DABMoE products and their underlying assets to exploit these innovations advances art in the field by addressing challenges faced by fund holders and managers alike: (i) risks attendant to standalone asset illiquidity causing market dislocations; and (ii) relatively cumbersome, less-automated legacy processes increasingly experiencing difficulties attempting to mitigate the risks.

Risks go up when supplies of useful standalone assets confined to absolute opposite order matching increase relative to demand, especially from speculators that thrive on liquidity. Risks are particularly extended to fungible-yet-varying credit instruments and commodities held in conventional exchange-traded products, like ETF's, which employ multi-basket structures (i.e., creation, redemption and holding baskets). To mitigate such ETF risks, "insider" transactions with Authorized Parties are permitted to increase liquidity and narrow differences between the product's publicly traded price and its NAV. Also, Fund Managers focus more on end-of-day NAV machinations, rather than providing more efficient price discovery and market valuation processes throughout each trading day. The teachings of the present disclosure conversely rely on use of computer implemented BCS-based algorithms to continuously mitigate risks of standalone asset illiquidity and market dislocations. As a result, ABETB's, ABMoE's and DABMoE's are offered as novel and commercially more efficient and proactive means to deal with excess illiquidity.

Organization of present disclosure: The present disclosure is organized as follows. Initially, a detailed description of the ABETB-centric order matching system according to the present disclosure is provided. Thereafter, BCS, key policies regarding trading ETD contracts employing BCS, and attendant security features are described. Subsequently, the ABETB-centric order matching system is described in detail with reference to various block diagrams and flowcharts shown and described with reference to FIGS. 1A-14.

ABETB-centric order matching system: The ABETB-centric order matching system according to the present disclosure is designed to transform connectivity between physical asset markets and the financial sector, comprising an exchange-specified plurality of fungible assets possessing varying quantitative, qualitative, logistics, and settlement timing properties, each gaining transparency and liquidity via hybrid paradigm formed by Benchmark Complex Solutions ("BCS") that satisfy practically, rather than absolute, opposite counterparties' trading interests to facilitate continuous market price discoveries sufficient to consistently maintain relative value equivalency among all qualifying assets underpinning the ABETB and maintained in exchange-segregated, -managed, and -controlled inventories.

Conventional exchange traded derivatives ("ETD") platforms dealing almost exclusively with cash-settled commodity and financialized futures, options, etc. have experienced tremendous growth in trading contract volumes during this millennium to ultimately attain a state of hyper-liquidity where markets operate at their most efficient and transparent levels. Key factors in attaining such levels are progressive IT advances in data transmission and validation speeds and high degrees of standardization whereby ETD contracts arbitrarily denote single-form asset benchmarks for absolute opposite order matching, theoretically satisfying (arguably incorrectly) all counterparties dealing with varying forms of the operative asset.

Those scenarios are described in U.S. Pat. Nos. 9,002, 741; 9,460,470; 10,269,070; 10,515,115; and U.S. patent application publication 20190095995. These filings advanced art in the field inter alia by defining BCS comprising uniformly applied systems, methods, and instruments developed to maximize physical settlements of standardized-yet-customizable ETD orders for fungible-yet-varying assets (not merely financialized trading contracts) involving processes whereby counterparties are authenticated to gain wider satisfaction when placing orders for asset form matching based on practically opposite interests, while their respective COI are authenticated to access requisite trade data pertaining to such orders over an attendant ECN on a need-to-know, -act, and -store basis.

Matching practically opposite counterparty interests within the confines of ABETB requires considerably more complex processes involving a wider range of trading and other platforms compared to those engaged in merely matching absolute opposite orders for arbitrarily specified cash-settled futures and options contracts. The present disclosure describes how a BCS-based order matching system can overcome those complexities to enable multitudes of platforms, counterparties, and their COI to benefit from the aforementioned IT advances aimed at optimizing connectivity, further still, between physical asset markets and the financial sector as part of a novel and more efficient path toward hyper-liquidity.

The teachings of the present disclosure further the scope of technology protected by previously cited patent filings directed to BCS developed for trading and hedging fungible-yet-varying assets qualifying as members of an exchange-formulated Weighted Average Benchmark ("WAB") Set. The present disclosure relates to ABETB, a novel financial product backed by exchange-specified tradable assets formulated in baskets that can be transparently maintained and regularly replenished by proprietary asset-cycling systems employing practically opposite matching and relative value equivalency processes predicated on BCS. Designed to compete with Exchange-Traded Funds ("ETF's") and other investment products gaining popularity in secondary markets by exploiting the use of fractionalized interests, ABETB's can be described as possessing the following characteristics.

Specifically, ABETB's are single asset baskets designed to emulate WAB sets linked to exchange-specified varying assets, with many billions of dollars of commodities and credit instruments particularly suited for inclusion since GLEBS affiliated ETD platforms would benefit considerably by added transparency and liquidity ensuing from such arrangements. Under BCS, each asset in an ABETB is valued at the operative WAB set market price±adjustments linked to market prices for cash-settled Complementary and Forward Point Delivery Differential Indexes (CDI's and FPDDI's), the requisite number of contracts of which are determined by proprietary algorithms formulated to factor the impact of qualitative, logistics, and settlement timing variability applying under the circumstances, as well as any positive or negative asset carrying costs not otherwise provided for directly as part of CDI and FPDDI contracts.

ABETB's are sets of single asset baskets, structured for more diversified offerings, e.g., Asset-Backed Medium of Exchange ("ABMoE") developed for the Global e-Counter barter and countertrade platform described in U.S. Pat. No. 9,460,470. Complementing core physical asset baskets with varying levels of US dollar and/or foreign currency baskets, ABETB's produce meaningful stores of value aimed inter alia at consistently outperforming the annual rate of inflation. Digitized (i.e., securitized and tokenized) ABMoE, called DABMoE, can also be formulated to offer secondary cryptocurrency markets diversely substantive alternatives to Bitcoin and the plethora of Altcoins in the field.

ABETB's are structured to enable each of a single asset basket's contents to be periodically replenished and continuously valued by a proprietary asset-cycling system based on practical (rather than absolute) equivalency and links to market prices of the operative WAB set and differential indexes discovered throughout each trading day via ECN and CPL, achieved by integrating GLEBS' computerized trading platforms as elucidated throughout the patents referenced above.

The BCS-based counterparty matching comprises the following operations performed by one or more exchange affiliates. The BSC-based counterparty matching includes one or more exchange affiliates formulating a weighted average benchmark ("WAB") set linked to an exchange-specified plurality of qualifying asset forms, rather than arbitrarily denoting one single asset form as the benchmark for all forms of that asset. The BSC-based counterparty matching includes one or more exchange affiliates identifying and factoring the impact of quantitative, qualitative, logistics, and settlement timing properties unique to each of the qualifying asset forms comprising a neutral WAB formulated by the exchange for the entire set.

The BSC-based counterparty matching further includes one or more exchange affiliates providing uniform allowances for cases where traders physically own or are seeking to own varying-yet-fungible asset forms, each qualifying as an interchangeable component of an exchange-specified set, offer or bid their specific asset form pursuant to standardized spot or forward Exchange for Physical (EFP) contracts calling for settlement by physical delivery or receipt of their respective underlying assets, with each contract's specifications linked to an operative WAB formulated by the exchange to cover an entire set of qualified asset forms.

The BSC-based counterparty matching further includes one or more exchange affiliates ensuring that each component in a Weighted Average Benchmark (WAB) possesses quantitative characteristics, as well as varying qualitative, logistics, and settlement timing properties that customarily add to or detract from each respective asset's market value, the net aggregate effects of which are uniformly balanced exchange-wide by methods integral to the following: establishing benchmark-specific WAB sets, each formulated for incorporation into a family of standardized exchange-traded derivatives ("ETD") contracts, the ETD contracts typically including spots, forwards, futures, options and spreads, specifications of which differ only by timing and type of settlement taking place; requiring EFP spot and forward traders to acquire a specific number of long or short Complementary Differential Index (CDI) contracts, for cash tendered or received as the case may be, linked to varying qualitative and logistics attributes of underlying assets respectively delivered or received, and to ensure co-delivery of such contracts as of an operative EFP physical delivery date; and requiring EFP spot and forward traders to acquire a specific number of long or short Forward Point Delivery Differential Index (FPDDI) contracts, for cash tendered or received as the case may be, linked to the negotiated timing of underlying assets respectively delivered or received, and to ensure co-delivery of such contracts as of an operative EFP physical delivery date.

The BSC-based counterparty matching further includes one or more exchange affiliates uniformly employing the forgoing methods to formulate, acquire, maintain, and hedge future price volatility risks of ABETB and ABMoE on a practically equivalent basis, achieved by instilling parameters for cycled interchange of varying-yet-fungible assets qualified within exchange-specified baskets underpinning the forgoing, the parameters serving to account for qualitative, logistics, supply chain, life cycle and any other positive or negative cost of carry factors unique to the assets held and, when necessary, securitized by exchange(s), all taking place prior to deliveries scheduled to meet future commitments to counterparties, plus assets held in reserve by exchange(s) to ensure their ongoing role as order liquidity provider(s), with such parameters incorporated as part of proprietary float processes employed within the confines of an affiliated exchange organization-wide inventory management and control system.

Different from the DABMoE exchange or the DABMoE Conversion Module ("DCM") disclosed in U.S. patent application publication 20190095995, Global d-Bourse is designed to cooperate with GLEBS-affiliated platforms, plus others when necessary, to undertake the following functions: formulating WAB Sets specified for ABETB; enhancing aggregate GLEBS-wide liquidity by cross-listing ABETB products over multiple platforms inside and outside GLEBS and effectuating back-to-back order executions accordingly; exercising constructive management and control over assets acquired and stored prior to satisfying physical delivery commitments to ETD and other platforms inside and outside the GLEBS group, including those assets employed to underpin ABETB; exercising constructive management and control over assets cycled in and out of ABETB in a manner that consistently maintains market value equivalence as practically, rather than absolute, opposite assets are interchanged, which involves continuously maintaining a transactional database containing all GLEBS affiliates' ETD contract market prices attendant to EFP spots and forwards, futures, options, and swaps, and using proprietary algorithms to determine which Complementary and Forward Point Delivery Differential Indexes (CDI and FPDDI) and should be used to determine the extent to which cash adjustments must be paid or received as part of any asset cycling transaction; and otherwise acting as a liquidity provider engaged in BCS-based order matching processes, as shown in FIG. 15 and exemplified in more detail below.

The BCS-based algorithms uniformly factor the integrated effects of each trader's specified asset form posted in its bid/offer vis-a-vis the latest offers/bids posted for their operative spot or forward contract. The algorithm output identifies the requisite quantities of Complementary Differential Index and Forward Point Delivery Differential Index (CDI and FPDDI) contracts to be bought or sold by each counterparty pursuant to an exchange-wide pursuit of aggregate zero-sum equivalence achieved within the confines of practically opposite matching. Graphical User Interfaces (GUI's) display algorithm-generated output to provide each buyer and seller with computed data that continuously indicates net cumulative all-in market prices and values attributable to each asset on an equivalent-for-equivalent basis. For example, see claims 9 through 13 of U.S. Pat. No. 10,269,070 that provide more detailed teachings regarding the forgoing.

The BCS-based order matching for commodities is now described. Following is an overview of counterparty matching processes integral to organizing affiliated exchanges' computerized trading platforms dealing with commodities, each qualified in a basket of varying-yet-fungible commodity forms comprising an ABETB formulated and offered as alternatives to certain ETF's and other financial products.

The counterparty matching processes include identifying trading party types (denoted for each respective party at dongle-enabled sign-in). The trading party types include Commodity Producers (Sellers), Commodity Users (Buyers), Exchange Market Makers (Covering Buy and Sell Sides), Commodity Trading Firms (Covering Buy and Sell Sides), and Global d-Bourse (Covering Buy and Sell Sides).

The processes followed to fill buy-side orders (iterative until a match is executed) include the following. Commodity User posts bid data for specific commodity form (the "CUspCF") that qualifies within a specified plurality of forms comprising an operative exchange-formulated WAB Set, with the bid data indicating desired quantity, incoterms and price, as well as exchange confirmation that the Commodity User is logistically and financially qualified to take delivery of the denoted commodity pursuant to the terms of its bid. The exchange compares Commodity User's bid data with offer data posted by Sellers—in this case, primarily Commodity Producers, Exchange Market Makers, and Commodity Trading Firms—aimed at identifying whether an absolute matching offer exists to offset against Commodity User's bid.

If no absolute matching offer emerges, the exchange inquires with Global d-Bourse to see if it is willing and able to sell CUspCF inventory in its possession to the Commodity User, which is a decision Global d-Bourse makes after determining the extent to which required quantity of CUspCF is physically available and uncommitted pursuant to Global d-Bourse inventory management and control guidelines; and after determining the extent to which different yet practically equivalent form(s) of the commodity (i.e., also qualifying in the attendant WAB Set's plurality) can be acquired to suitably replace the CUspCF at values acceptable to Global d-Bourse.

If the above process still fails to result in an absolute match, the exchange informs Commodity User whether matching offer(s) for the CUspCF are posted, albeit at higher selling price(s), by one or more of the aforementioned Sellers; or different yet practically equivalent form(s) of the desired commodity (i.e., qualified as another component in the WAB Set's specified plurality) are available in the quantity sought and at a comparably similar unit price equivalent to that originally sought by the Commodity User with respect to CUspCF.

The processes followed to fill sell-side orders (iterative until a match is executed) include the following. Commodity Producer posts offer data for a specific commodity form (the "CPspCF") that qualifies within a specified plurality of forms comprising an operative exchange-formulated WAB set, with the offer data indicating desired quantity, incoterms and price, as well as exchange confirmation that the Commodity Producer is logistically and financially qualified to make delivery of the denoted commodity pursuant to the terms of its offer. The exchange compares Commodity Producer's offer data with bid data posted by Buyers—in this case, primarily Commodity Users, Exchange Market Makers, and Commodity Trading Firms—aimed at identifying whether bid(s) can be absolutely matched with Commodity Producer's offer.

If no absolute matching bid emerges, the exchange inquires with Global d-Bourse to see if it is willing and able to buy CPspCF from the Commodity Producer for inclusion as part of the tradable asset inventories under its constructive control, which is a decision Global d-Bourse makes pursuant to its inventory management and control guidelines. If the process still fails to result in an absolute match, the exchange informs Commodity Producer whether matching bid(s) for the CPspCF have been posted, albeit at lower price(s), by one or more of the aforementioned Buyers.

The BCS-based matching can also be used for credit instruments. Excluding the effects of Quantitative Easing (QE) pursued by central banks, globally, bond market liquidity has dropped significantly in the aftermath of global financial crises occurring during this millennium due to factors such as substantial growth in outstanding bond issue breadth and volume, bank and broker-dealer consolidations depleting the ranks of market makers, and government regulations cutting into capital levels that market makers can to commit to holding credit instrument inventories.

According to some financial institutions, lack of liquidity is most prevalent in non-U.S. Treasury markets entailing much larger volumes of outstanding issues. This is particularly true in the case of corporate bonds where investors are less likely to find parties to trade with, much less discover prices they want to transact at. Investors therefore desire more efficient, versatile and affordable means to satisfy all aspects of acquiring the right security, hedging against that security's price volatility risks and then selling the security to exit entirely or diversify within the asset class.

Some innovations have emerged for that purpose, e.g., diversified ETF's and distributed ledger technologies offering efficiencies to increase order transparency and decrease customer trading costs, respectively. GLEBS aims to advance diversity of art in this field via affiliated computerized trading platforms employing BCS within an ECN customized to facilitate the use of permissioned ledgers. This is the case for Global Credit e-Bourse, which is developed to generate standard systems, methods, and ETD contracts (esp. physically-settled spots and forwards) linked to pluralities of fungible credit instruments qualified in WAB sets to underpin ABETB, factoring attributes such as bond classifications and varying qualitative attributes. Examples of bond classifications include corporate industrials, transports, utilities, and financial services, plus various types of preferred stocks, leveraged loans, municipals and even Sharia-based Sukuks. Examples of varying qualitative attributes include coupon rate of interest, credit quality rating, and remaining time to maturity/convertibility/callability, each incorporated into standardized WAB integrated with Complementary Differential and Forward Point Delivery Differential Indexes (CDI and FPDDI).

Following is an overview of order matching processes integral to individual credit instruments qualifying within a diverse basket of securities comprising an ABETB comprising an exchange-formulated WAB Set. The order matching processes include identifying Trading Party Types (denoted by each respective party per dongle-enabled sign-in). The Trading Party Types include Buyers of physically-settled spot and forward ETD contracts linked to individual securities that qualify as components of an exchange-formulated WAB Set (i.e., a basket of credit instruments, also referred to as an Exchange-Traded Bond Basket or "ETBB"). The Trading Party Types include Buyers of physically-settled spot and forward ETD contracts linked to ETBB, qualifying as one or more components within a plurality of tradable asset baskets underpinning an ABMoE. The Trading Party Types further include Sellers of either of the forgoing, Exchange Market Makers (covering both buy and sell Sides), and Global d-Bourse (covering both buy and sell sides).

The processes followed to fill buy side orders (iterative until a match is executed) include the following. Buyer posts bid data for a specific credit instrument that is a qualified component of an operative exchange-formulated WAB Set, with the bid data including desired quantity and price. The exchange compares Buyer's bid data with offer data posted by Sellers, including Exchange Market Makers, aimed at identifying whether an absolute matching offer exists.

If no absolute matching offer emerges, the exchange inquires with Global d-Bourse to see if there is willingness and ability to sell inventory in its constructive possession to the Buyer, which is a decision Global d-Bourse makes after determining whether required quantity of the asset desired by Buyer is physically available and uncommitted pursuant to Global d-Bourse inventory management and control guidelines; or after determining whether practically equivalent alternative credit securities (i.e., also qualifying within attendant WAB Set's plurality) can be acquired, at satisfactory terms, to suitably replace assets removed from Global d-Bourse inventory for sale to Buyer.

If the process still fails to result in absolute match, the exchange informs Buyer whether matching offer(s) for the desired asset is posted, albeit at higher selling price(s), by one or more of the aforementioned Sellers; or whether practically equivalent alternative form(s) of the desired asset (i.e., qualified within the WAB Set's specified plurality) are available in the quantity and at a satisfactorily equivalent unit price to what was originally indicated by the Buyer.

The processes followed to fill sell side orders (iterative until a match is executed) include the following. Seller posts offer data for a specific credit Instrument security that's a qualified component of an operative exchange-formulated WAB Set, with the data including desired quantity and price. The exchange compares Seller's offer data with bid data posted by Buyers, including Exchange Market Makers, aimed at identifying whether absolutely matching bid(s) exist.

If no absolute matching bid emerges, the exchange inquires with Global d-Bourse to see if it is willing/able to buy the securities from the Seller for inclusion as part of the tradable asset inventories under its constructive control, a decision Global d-Bourse makes pursuant to its inventory management and control guidelines. If the process still fails to result in absolute match, the exchange informs Seller whether any matching bid(s) for the credit instrument securities have been posted, albeit at lower price(s), by one or more of the aforementioned Buyers.

Accordingly, ABETB's are novel financial products backed by exchange-specified tradable assets formulated into baskets whose contents can be continuously replenished and valued by proprietary asset-cycling systems and methods employing practically, rather than absolute, opposite matching processes predicated on BCS. Designed to compete with ETF's and other fractionalized interest investment products emerging in secondary markets today, ABETB's are structured as single asset baskets as well as sets of single asset baskets.

The single asset baskets are designed to emulate Weighted Average Benchmark ("WAB") Sets linked to exchange-specified plurality of qualifying asset forms. Each single asset basket in an ABETB is backed by fungible-yet varying assets; and many billions of dollars of commodities and credit instruments particularly targeted for trading over GLEBS affiliated Exchange-Traded Derivatives ("ETD") platforms should benefit considerably by the added liquidity ensuing from such arrangements. Assets are cycled in and out via practically opposite matches, executed at prevailing market prices±cash adjustments tied to BCS-based Complementary Differential Indexes (CDI's) uniquely valuing the intrinsic impacts of qualitative, logistics, and settlement timing variability.

ABETB's are also structured as sets of single asset baskets, structured for more diversified offerings, such as ABMoE fractionalized interest instruments developed for the Global e-Counter (barter and countertrade) platform per U.S. Pat. No. 9,460,470. Complementing with US Dollar and foreign currency baskets, these build meaningful stores of value aimed inter alia at outperforming annual rates of inflation. Digitized (i.e., securitized and tokenized) ABMoE (called "DABMoE") are also designed to provide global cryptocurrency ("CC") markets with diversely substantive alternatives to Bitcoin and the plethora of Altcoins in the field.

The ABETB systems and methods disclosed herein further the scope of technology protected by U.S. Pat. Nos. 9,002,741, 9,460,470, and 10,269,470 directed to BCS developed to trade and hedge individual fungible-yet-varying assets qualifying as members of an exchange-formulated WAB Set. BCS were originally developed to boost transparency, liquidity and volume of physically-settled ETD contracts predicated on matching practically, rather than absolute, opposite counterparty trading interests. The market values of assets cycled in and out of ABETB are linked to WAB Set prices that can be continuously discovered, transparently, throughout each trading day over a cryptographically assured Exchange-Controlled Network ("ECN") and posted onto customized permissioned ledgers ("CPL"), all achievable by integrating GLEBS affiliates' computerized trading platforms as elucidated in the patents noted above, as well as more comprehensively in U.S. Pat. No. 10,510,115.

Additionally, U.S. Patent Application Publication No. 20190095995 is directed to a BCS-based hybrid paradigm formed to further increase transparency, liquidity, and volume by creating synergy to uniformly provide standardized-yet customizable trading, hedging, digitization, repo-based finance, and asset management and control systems, methods and instruments, GLEBS-wide, upon integration of its affiliates' IT Resources (esp. ECN and CPL) and reporting processes; and by cycling fungible-yet-varying assets in and out of ABETB alongside securitization and tokenization processes essential to DABMoE and CC offerings.

The following is a brief description of Benchmark Complex Solutions (BCS) and key policies for trading Exchange Traded Derivatives (ETD) contracts employing BCS. Rather than arbitrarily denoting a single asset form as the benchmark for all forms of that asset, BCS formulate a more practical weighted average benchmark ("WAB") set linked to an exchange-specified plurality of qualifying asset forms. Geographic, quantitative, and qualitative properties unique to any plurality of denoted asset forms can provide the bases of a neutral and unbiased WAB formulated by the Exchange for the entire set.

Traders physically owning or seeking to own differing-yet-interchangeable asset forms (each qualified as a component of an exchange-specified set) can offer/bid their respective asset form via standardized set of EFP contracts linked with an operative WAB formulated by the exchange to cover the entire set of qualified asset forms. BCS' novel order-matching process—based on satisfying counterparties' practically, rather than absolute, opposite, interests—is designed to satisfy all parties' demands for more flexibility, transparency, liquidity and cost effectiveness. Spot and EFP-forward contracts specify physical delivery and receipt, respectively, of underlying assets.

Each component in a WAB has specific geographic and other quantitative characteristics, as well as varying qualitative properties that customarily add to or detract from that asset's market value, the net effects of which can be balanced exchange-wide by proprietary algorithms integral to the standardized ETD contracts designed for (i) benchmark specific (WAB) sets, (ii) complementary differential indexes and (iii) forward point delivery differential indexes. The forgoing ETD contracts [(i)-(iii)] have been custom-formulated for transparent trading in the open market; each/all structured to be co-settled as of the operative spot or EFP-forward contract's physical delivery date. Offering strictly financially-settled versions of those ETD contracts (each on a standalone basis) likewise offer considerable appeal to speculators and other financial investors.

The following are Key Policies for trading ETD contracts employing BCS. Each exchange-formulated WAB Set is based on distinct geographic, quantitative, qualitative, and logistics attributes that can be incorporated into a family of standardized ETD contracts, the specifications of which differ only by the timing and type of settlement taking place. Financially settled contracts linked to WAB Sets—available to all exchange customers—trade similarly to today's arbitrarily-denoted single asset form benchmark contracts (e.g., Brent or WTI crude oil) typically executed over conventional regulated futures exchanges. Spot and EFP-forward contracts linked to WAB Sets can be traded by qualifying (i.e., dongle-authenticated) customers meeting the exchange's applicable financial, logistics, and other requirements attendant to delivering/receiving their traded contracts' underlying assets.

Spot and EFP-forward customers must buy/sell a requisite number of financially settled Complementary Differential ("CD") Index contracts determined by algorithms attendant to the varying qualitative attributes of respective underlying assets being delivered or received. Spot and EFP traders must co-deliver the CD Index contracts as of their contract's operative physical delivery date. The CD Index contracts, available for trading by all exchange customers, are listed with expiration dates.

EFP-forward customers must buy/sell a requisite number of financially settled Forward Point Delivery Differential ("FPDD") Index contracts computed by algorithms attendant to negotiated timing of respective underlying assets being delivered/received. EFP-forward traders must co-deliver FPDD Index contracts as of their contract's operative physical delivery date. FPDD Index contracts, available for trading by all exchange customers, are listed with expiration dates.

Certain qualifying customers can convert their net open long or short cash-settled WAB Set contracts for EFP-forward contracts subject to (i) exchange verifying that sufficient physical assets are available as of those contracts' operative physical delivery dates; and (ii) the customer buying/selling requisite (algorithm determined) number of CD Index and FPDD Index contracts called for under the circumstances.

In summary, each one of GLEBS' standardized-yet-customizable ETD contract families is uniquely formed to enhance transparency, liquidity, and flexibility in a manner that will attract not only a wide range of commercials but also financial investors and speculators.

Accordingly, the present disclosure provides novel financial products in the form of Asset-Backed Exchange-Traded Baskets (ABETB's) and Asset-Backed Mediums of Exchange (ABMoE) comprised of sets of ABETB. Additionally, as shown in FIG. 15, Global d-Bourse serves as a liquidity provider engaged in BCS-based matching of practically opposite assets underlying physically-settled WAB set ETD contracts; serves as an automated market data provider of continuously updated standalone and BCS-based "all-in" bids, offers, and executed orders for WAB, CDI, and FPDDI contracts, as well as for ABETB, ABMoE, and DABMoE, thereby facilitating efficient price discovery; and serves as a provider of BCS-based algorithms applied to the forgoing, the net cumulative effects of which transform WAB set contracts to "all-in" market price indications for respective assets qualifying as underlying members of (i) ABETB and (ii) inventories managed and controlled to meet Exchange Affiliates-wide commitments for physically settled spot, forward, and ABETB asset-cycling transactions.

Additionally, integrating Global d-Bourse with GLEBS' already-patented platforms/ECN's yields an exclusive game-changing hybrid paradigm leveraging multi-market price discoveries to optimize all-in BCS-based price liquidity. The hybrid paradigm comprises digitizing (i.e., securitizing+tokenizing) and managing varying-yet-fungible and cyclable physical asset-backed units, baskets (distinct alternatives to ETF's backed by futures contracts—e.g., "USO" criticized for exacerbating recent oil market dislocation), and mediums of exchange (DABMoE) that can be financed by repurchase agreements or other debt instruments in special purpose vehicles. The hybrid paradigm further comprises managing the physical assets' price volatility risks via GLEBS' diverse ETD hedging solutions.

DABMoE can transform a nascent field that's been dominated to date by native cryptocurrency payment systems (i.e. Bitcoin) and thousands of so-called utility tokens (the latter, called "altcoins", using funds raised from initial coin offerings or "ICO's") since those competitors tend to lack backing of substantive assets other than fiat currencies, and their IT and social networking platforms.

Bitcoin and altcoins disregard many trillions of dollars of tangible assets, held globally, in storage facilities or investment venues. Many underutilized fungible assets are ripe for formulation into diversified weighted average DABMoE baskets that can be securitized into units of ownership made eligible for use and trading by wholesale customers over a variety of Global e-Bourse Suites platforms, as well as retail customers of external cryptocurrency exchanges (and related wallet and payment processing apps).

Until now, many real-world assets have been difficult to physically manage, control and subdivide to accommodate ownership by multiple investors. Conventional financialized futures linked to arbitrary single-form benchmarks (requiring monthly rolling) are not suited for truly substantive securitized tokens. Conversely, GLEBS' core inventions enable traders to overcome such challenges by uniformly employing exchange-based systems, methods, and standardized instruments that can be extended to the tradable assets comprising diverse DABMoE baskets, all designed to facilitate security, speed, and efficiency that is needed for optimal securitization and tokenization.

The investment field at large can benefit by Global d-Bourse working in cooperation with GLEBS' ETD platforms to help unlock values for many trillions of dollars of illiquid and otherwise under-utilized assets underpinning DABMoE unitary ownership interests and cryptocurrency tokens as they are bought, sold and traded in fractional shares transparently price-discovered over secondary markets—all taking place securely over centralized ECN. Attendant transaction costs can be minimized by way of the synergy created with GLEBS' other platforms.

Regarding security, ECN cryptography assures all key facets of Customized Permissioned Ledgers ("CPL"). Since Bitcoin going mainstream in years 2008-2009, Blockchain—today, a generic term for the type of technology solutions initially providing Bitcoin's cryptocurrency functionality—has gained increasing notoriety in media outlets, globally, not to mention IT investment spending. Today's fintech space features a variety of ledger system developers (e.g., consortiums like Digital Asset Holdings, R3 Corda, JP Morgan's Quorum; Ripple's payment protocol in the U.S. and others in Asia and Europe) vying to provide Blockchain-like solutions. With transactions, contracts, and other information maintained in databases consensually shared and synchronized over networks spread across multiple sites, institutions and geography, such ledger systems aim to eliminate needs for single/central authorities to keep a check against manipulation. Vying systems must interoperate and comply with standard policies before digital ledger technologies can be successfully exploited globally.

GLEBS' art in this field does not emulate existing decentralized crypto-currency solutions. Rather, it provides CPL solutions specifically attuned to ECN's that employs GLEBS' synergistic ETD systems, methods, and instruments. The following is a synopsis of the CPL solutions: (1) Privacy of transactional data shared with COI is critically important; (2) Data is securely and accurately produced and stored using cryptography; (3) Access involves authentication using keys and cryptographic signatures; and (4) Once stored, all the data is part of an immutable database governed by rules of the ECN.

Under GLEBS' security design, ECN and CPL would be very difficult to intrude—to succeed, all network copies shared with authorized COI nodes would have to be attacked simultaneously—and records would be resistant to malicious changes by any single party. Post-trade processing—where an exchange and its COI compare/approve transaction details; change ownership and custodial records; and arrange for asset and cash transfers—can take place efficiently and economically via the CPL system.

At this stage, if CPL processes, preceding what is termed "post-trade," have not completely converged with low latency connectivity provided by current-day exchanges to optimize high-frequency trading, qualifying traders can merely (i) accumulate financially settled ETD positions (i.e., their "open interest") via the exchange's existing low-latency connection and (ii) convert the positions to the required number of EFP contracts called for under the circumstances by using different-yet-efficient ECN connectivity that is compatible with the CPL needs of its COI members. Transitional processes can also take place whereby certain existing conventional ETD contracts (such as for WTI or Brent crude oil futures) get "grandfathered" pursuant to a conversion algorithm that comports with GLEBS' applicable BCS-based solutions.

Micro-segmentation ("pSeg") is an option that can help customize and secure permissioned ledger systems employed over Global e-Bourse Suites' ECN. pSeg has become widely recognized as an efficient means of delivering operational agility for network virtualization that is foundational to modern software-defined data center networks. It is increasingly employed in cloud solutions provided by Amazon, Microsoft, VMware, IBM, etc. Agnostic solutions (e.g., Unisys Stealth) offer advanced cryptographic functionality.

pSeg can keep different parts of Global e-Bourse Suites platforms logically separate via hardware and/or software (defined in above patents as "dongles") encrypted to maximize security of all authenticated network devices while also controlling (i) access to the ECN, (ii) what data is made available to each server over the ECN, (iii) where data is stored, and (iv) who manages various storage needs within the ECN's defined communities of interest ("COI").

pSeg also enables buy and sell orders to be cryptographically authenticated, posted and ultimately matched, executed, and confirmed as trades to be cleared, settled, and reported over ECN in compliance with policies and rules established by the exchange; all accomplishable contemporaneously without use of intermediaries in the chain of communications. Globally compliant cryptography systems—a list which is growing—can be used to effectuate and protect each CPL.

μSeg implementation involves loading software to ECN devices, with a management console typically coupled with bits of code that run on IP devices in the ECN. Together, they allow the exchange to layer on controls that decide who gets to do what, and easily enforce those rules at the network packet level.

pSeg is identity driven, straight from Active Directory or LDAP systems already in place. It can simply/quickly take control of new or existing enterprises—which will help legacy systems be efficiently transitioned—without the need to deal with challenges like firewall rules, outdated applications, remote users, cloud-based services and 3rd party attack vectors.

An example of an implementation of the ABETB-centric order matching system is now described with reference to FIGS. 1A-5. FIGS. 1A-2 show unique data structures of the ABETB-centric order matching system according to the present disclosure. For example, the ABETB-centric order matching system can be implemented on a server (e.g., server 130 shown in FIGS. 3-5 and described below). The data structures improve the functioning of the server implementing a database generally and improve the functioning of the database specifically. The functioning of the server and the database is improved by using a unique referential relationship between the data structures in ways that did not exist in prior art systems and that are faster and more efficient than the prior art systems.

The referential relationship between the data structures significantly reduces storage capacity and processing time associated with the database, particularly when the number of tradeable assets is relatively very large. As explained below, the referential relationship simplifies the operation of the database due to automatic updating of attributes of assets stored in a first data structure in real time as a stream of trading data modifies fields of a second data structure that are referentially related to the first data structure. Normally many individual calculations and aggregation of results of those calculations would be necessary, which is obviated by the referential relationship between the two data structures, and which allows for real time updating of attributes and valuations of the assets.

Figure 1B:
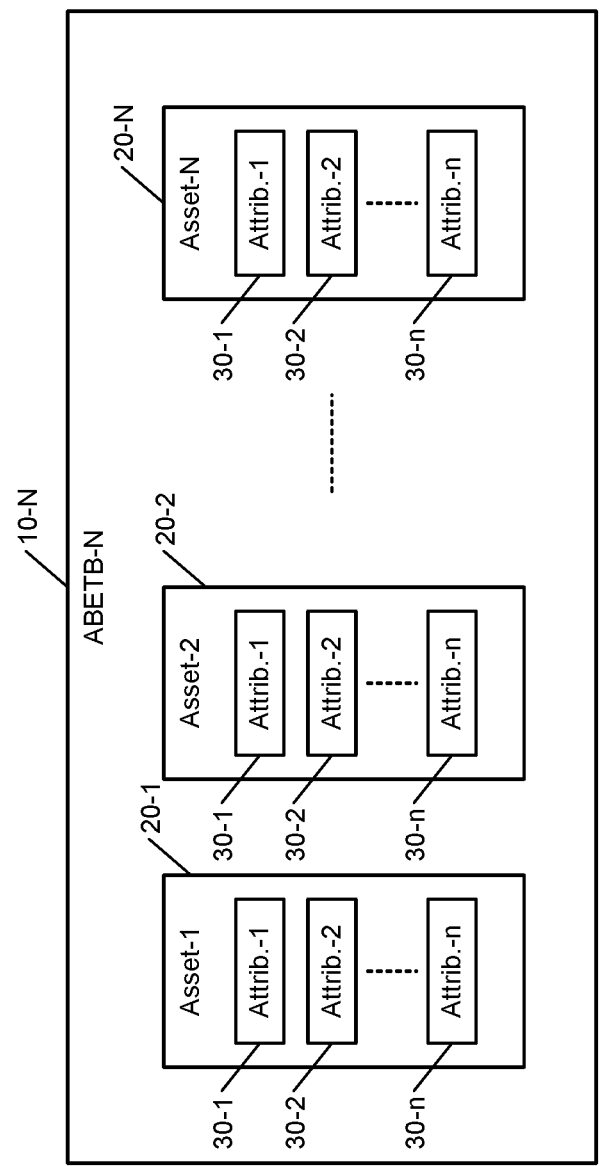
Figure 2:
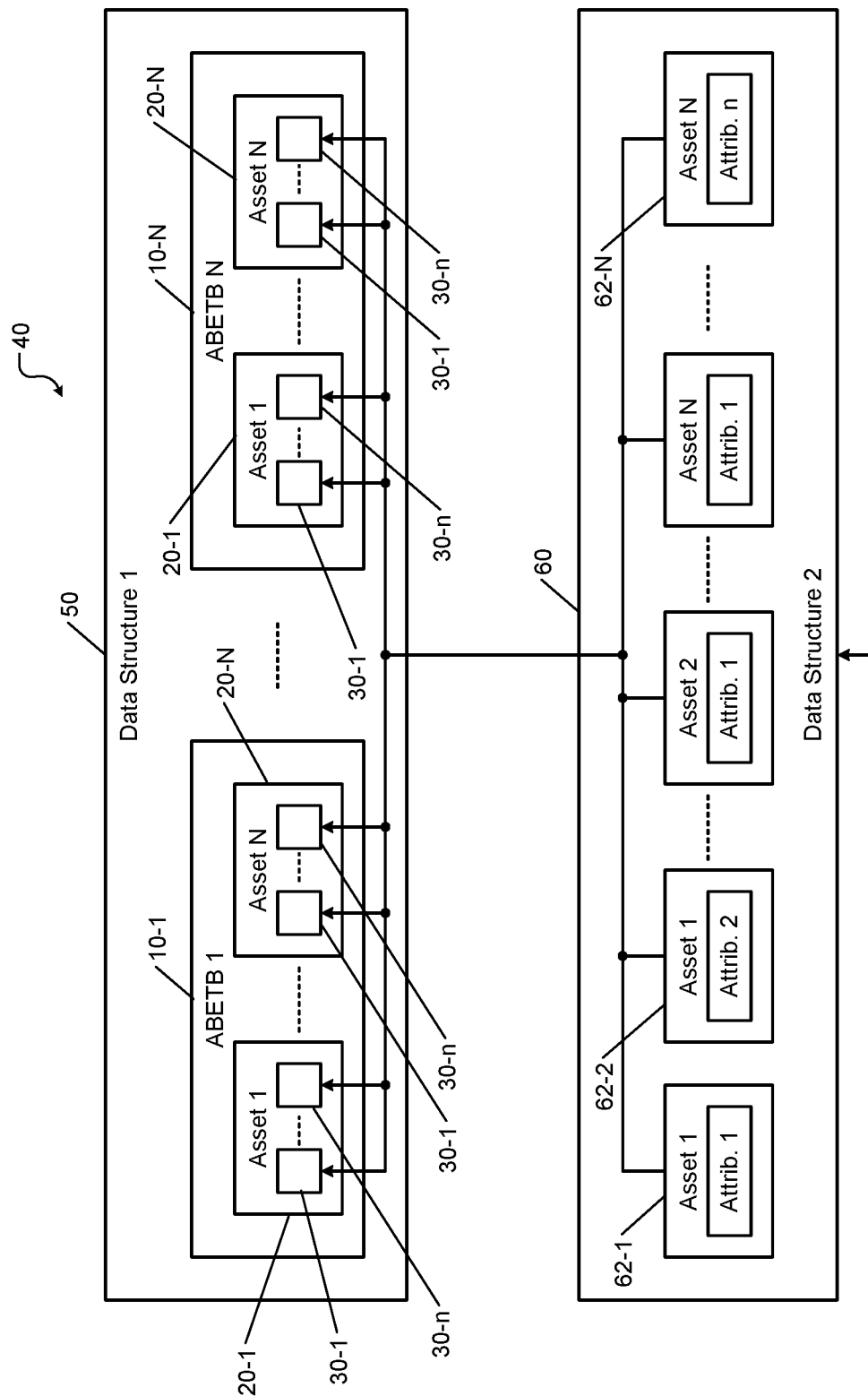
FIG. 2 shows an example of a database comprising first and second data structures for the ABETB-centric order matching system according to the present disclosure.

FIGS. 1A and 1B show an example of Asset-Backed Exchange Traded Baskets (ABETB's) according to the present disclosure. In general, a plurality of ABETB's comprise a plurality of fungible assets. For example, a first ABETB, shown as ABETB-1 10-1, may comprise fungible assets Asset-1 20-1, Asset-2 20-2, . . . , and Asset-N 20-N (collectively assets 20), where N is a positive integer. A second ABETB, shown as ABETB-2 10-2, may comprise fungible assets Asset-1 20-1, Asset-2 20-2, . . . , and Asset-N 20-N (collectively assets 20), where N is a positive integer. An Nth ABETB, shown as ABETB-N 10-N, may comprise fungible assets Asset-1 20-1, Asset-2 20-2, . . . , and Asset-N 20-N (collectively assets 20), where N is an arbitrary integer greater than or equal to 1. The ABETB's ABETB-1 10-1, ABETB-2 10-2, . . . , ABETB-N 10-N, where N is an arbitrary integer greater than or equal to 1, may be collectively called ABETB's 10. While each ABETB 10 is shown as including the same assets 20, each ABETB 10 can include different assets. Further, each ABETB 10 can include different quantities of each of the assets.

FIG. 1B shows one of the ABETB's 10 (e.g., the ABETB-N 10-N) in further detail. Each of the ABETB's 10 may have similar composition. For example, the ABETB 10 includes the assets 20. Each asset 20 has a plurality of attributes, which are shown as Attribute-1 30-1, Attribute-2 30-2, . . . , and Attribute-n 30-n (collectively attributes 30), where n is an arbitrary integer greater than or equal to 1. While each asset 20 is shown as including the same attributes 30, each asset 20 can include different attributes. Further, each asset 20 can include different number of attributes. Thus, each ABETB 10 is a data structure comprising fields associated with assets 20 and subfields associated with attributes 30 of the assets 20.

FIG. 2 shows a database 40 comprising first and second data structures 50, 60 according to the present disclosure. For example, the database 40 may be implemented as one of the databases 188 shown in FIGS. 3-5. The first data structure 50 stores the attributes 30 of the assets 20 of the ABETB's 10. The second data structure 60 comprises a plurality fields 62-1, 62-2, . . . , and 62-N (collectively fields 62), where N is an arbitrary integer greater than or equal to 1. The fields 62 in the second data structure 60 are referentially related to the attributes 30 of the assets 20 of the ABETB's 10 stored in the first data structure 50.

As a data stream comprising trading data associated with the assets 20 is received in the database 40 (e.g., via a distributed communications system 110 shown in FIGS. 3-5), one or more of the fields 62 in the second data structure 60 are modified by the trading data in real time. A change in one or more of the fields 62 in the second data structure 60 automatically and contemporaneously updates one or more attributes 30 of one or more of the assets 20 in the one or more ABETB's 10 due to the referential relationship between the fields 62 in the second data structure 60 and the attributes 30 of the assets 20 of the ABETB's 10 stored in the first data structure 50.

The referential relationship between the second and first data structures 60, 50 significantly reduces storage capacity and processing time, particularly when the number of underlying assets 20 in the ABETB's 10 are numerous. The referential relationship simplifies the operation of the database 40 due to the automatic updating of the first data structure 50 in real time as the stream of data modifies the second data structure 60. Normally many individual calculations and aggregation of results of those calculations would be necessary, which is obviated by the referential relationship between the two data structures 50, 60, and which allows for real time updating of the attributes 30 and valuations of the assets 20.

Thus, the referential relationship between the two data structures 50, 60 improves the functioning of the server implementing the database 40 generally and improves the functioning of the database 40 specifically. The functioning of the server and the database 40 is improved by using the referential relationship between the two data structures 50, 60 in ways that did not exist in prior art systems and that are faster and more efficient than the prior art systems.

Accordingly, a server (e.g., server 130 shown and described below with reference to FIGS. 3-5) connected to a network (e.g., distributed communications system 110 shown and described below with reference to FIGS. 3-5) may implement the ABETB-centric order matching system and may generate a database (e.g., one of the databases 188 shown and described below with reference to FIGS. 3-5) similar to the database 40. The database 188 may comprise the first data structure 50 configured to store attributes 30 of fungible assets 20, where the attributes 30 determine market values of the fungible assets 20. The database 188 comprises the second data structure 60 having fields 62 referentially related to the attributes 30 stored in the first data structure 50 such that a change in any one of the fields 62 induces a change in real time in a corresponding one of the attributes 30 in the first data structure 50.

The server 130 can receive a stream of data regarding one or more of the attributes 30 of the fungible assets 20 from the network 110. The server 130 can modify one or more of the fields 62 of the second data structure 60 based on the stream of data received from the network 110. The server 130 can allow at least one of cycling, liquidating, and replenishing of one or more of the fungible assets 20 associated with the first data structure 50 based on the modified one or more fields 62 of the second data structure 60. The server 130 can maintain a relative value equivalence of the fungible assets 20 based on the at least one of cycling, liquidating, and replenishing of the one or more of the fungible assets 20 associated with the first data structure 50.

Figure 3:
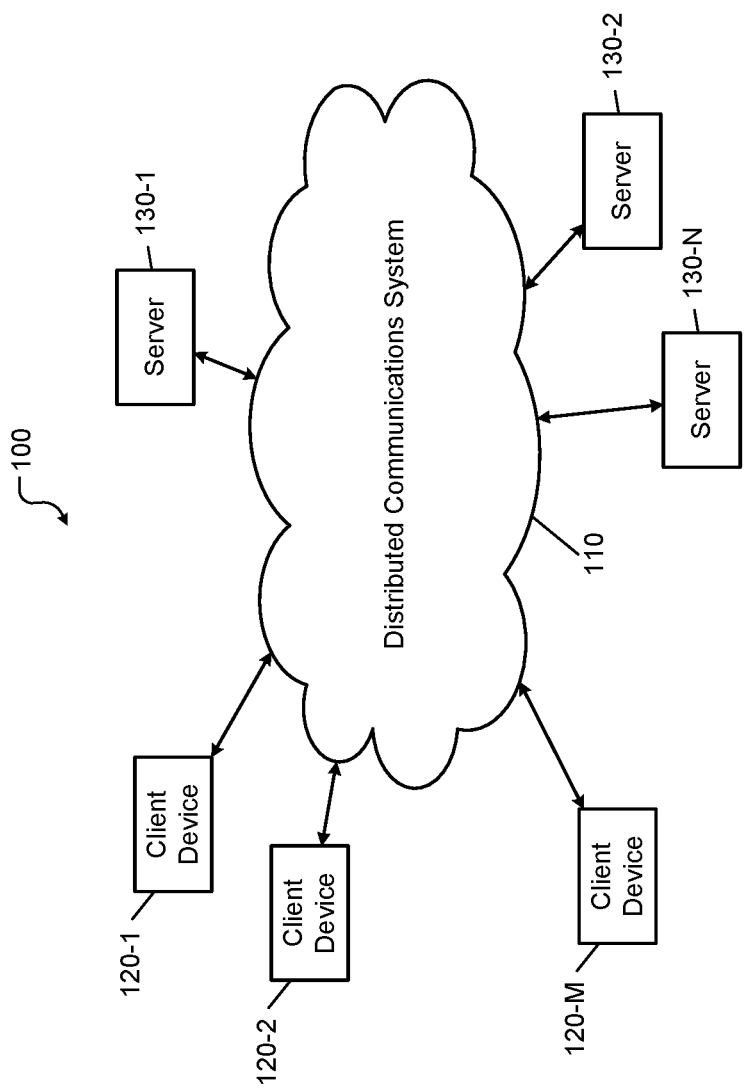
FIG. 3 shows a simplified example of a distributed computing system that can implement the ABETB-centric order matching system of the present disclosure.
Figure 4:
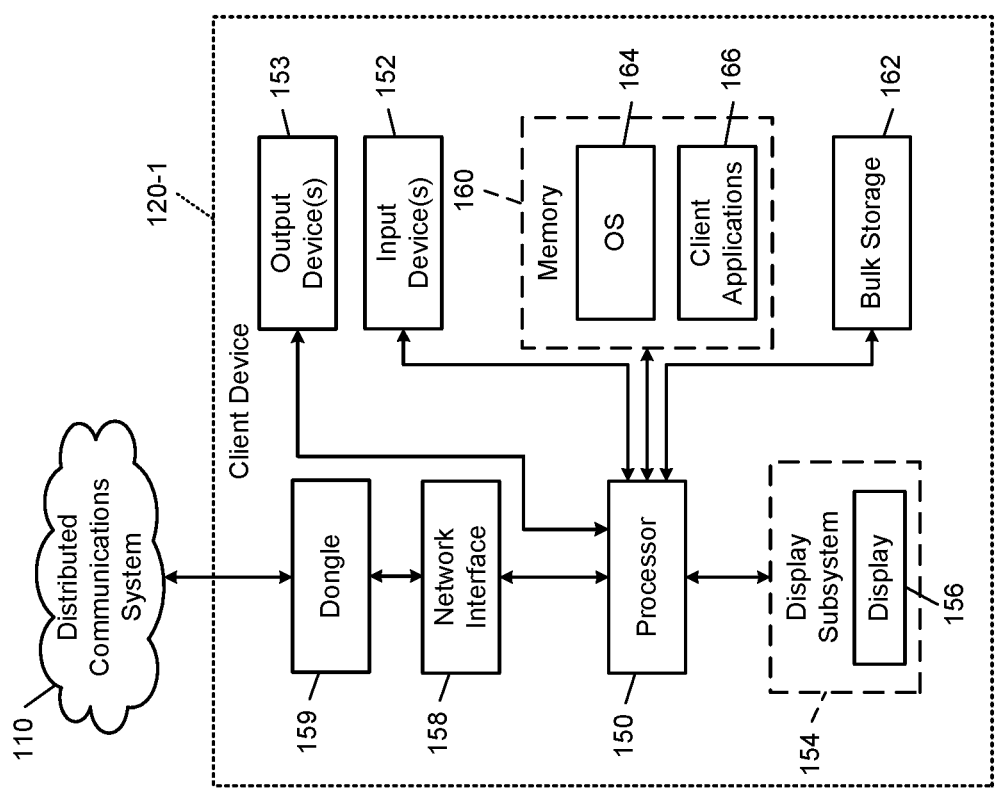
FIG. 4 shows a simplified example of a client device of FIG. 3.
Figure 5:
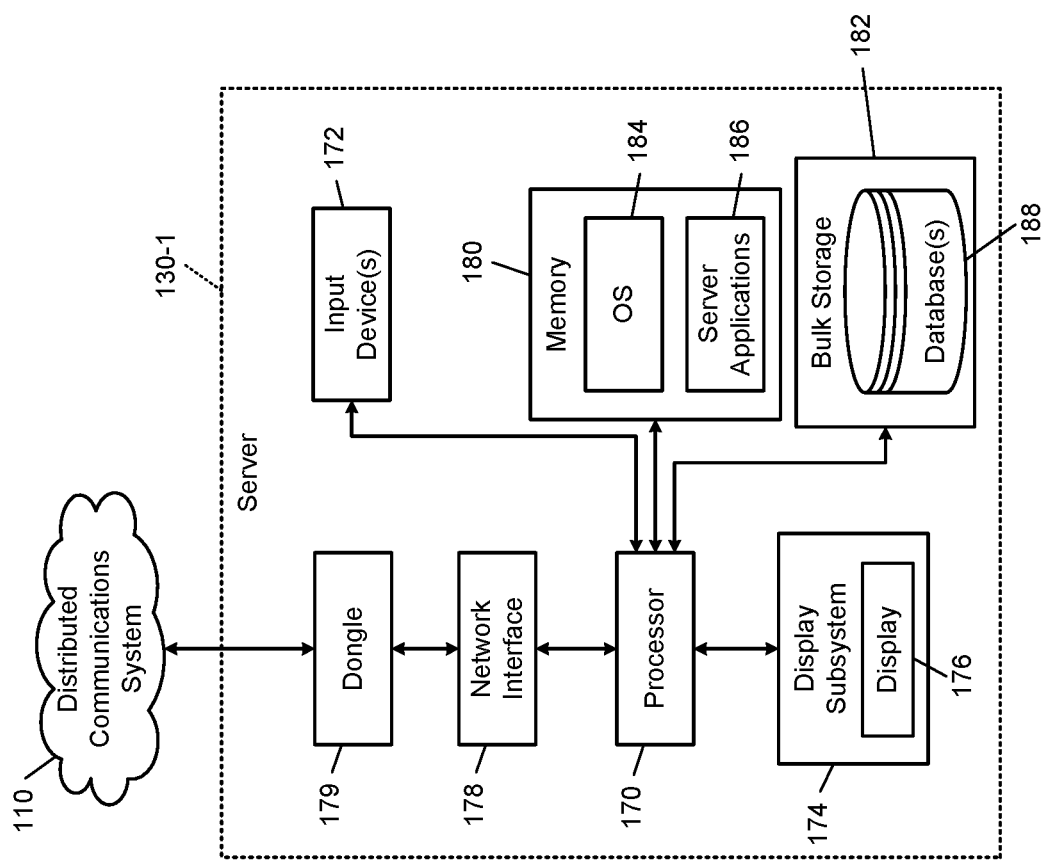
FIG. 5 shows a simplified example of a server of FIG. 3.

The server 130 maintains a plurality of baskets of the fungible assets 20 in the form of data structures in a database (e.g., database 188 shown in FIGS. 3-5). Thus, each ABETB is a data structure stored in the database, and each ABMoE generated by the server 130 based on the ABETB's is also a data structure stored in the database. It follows that the DABMoE's generated by the server 130 based on the ABMoE's are also data structures. All of these data structures—the ABETB's, the ABMoE's, and the DABMoE's—are referentially related to the second data structure 60 and are therefore automatically updated based on modifications to the fields 62 of the second data structure 60 made by the trading data received by the server 130 in real time.

FIG. 3 shows a simplified example of a distributed computing system 100 that can be used by the ABETB-centric order matching system according to the present disclosure. The system 100 includes a distributed communications system 110, one or more client devices 120-1, 120-2, . . . , and 120-M (collectively, client devices 120), and one or more servers 130-1, 130-2, . . . , and 130-N (collectively, servers 130). M and N are integers greater than or equal to one. The distributed communications system 110 may include a local area network (LAN), a wide area network (WAN) such as the Internet, or other type of network. The client devices 120 and the servers 130 may be located at different geographical locations and communicate with each other via the distributed communications system 110. The client devices 120 and the servers 130 may connect to the distributed communications system 110 using wireless and/or wired connections.

For example, the client devices 120 may include smartphones, personal digital assistants (PDAs), tablets, laptop computers, personal computers (PCs), etc. For example, the clients of the ABETB-centric order matching system may use the client devices 120 to interact with the ABETB-centric order matching system via the distributed communications system 110. For example, the client devices 120 may implement the devices used for trading by traders at various financial institutions (e.g., see FIG. 16). The client devices 120 (e.g., clients' mobile phones and/or laptops, the POS system 70, and the recycling machines 14) may execute suitable applications (shown as client applications 166 in FIG. 4) to perform respective functions (e.g., trading) by interacting with the ABETB-centric order matching system implemented on one or more servers 130 via the distributed communications system 110.

One or more of the servers 130 may implement the ABETB-centric order matching system. The servers 130 may provide multiple services to the client devices 120. For example, the servers 130 may execute software applications developed by one or more vendors (shown as applications 186 in FIG. 5). The servers 130 may host multiple databases (shown as 188 in FIG. 5) that are relied on by the software applications and the ABETB-centric order matching system in providing services to users of the client devices 120 (e.g., clients' mobile phones and/or laptops). The servers 130 implementing ABETB-centric order matching system may be implemented in a cloud. For example, the software applications executed by the servers 130 to implement the ABETB-centric order matching system may be distributed as software-as-a-service (SaaS).

FIG. 4 shows a simplified example of the client device 120-1. As mentioned above, the client device 120-1 may be any one of the clients' mobile phones and/or laptops. The client device 120-1 may typically include a central processing unit (CPU) or processor 150, one or more input devices 152 (e.g., a keypad, touchpad, mouse, touchscreen, scanner, etc.), one or more output devices 153 (e.g., a dispenser to dispense cash, coupons, receipts, etc. when the client device 120-1 is the recycling machine 14), a display subsystem 154 including a display 156, a network interface 158, memory 160, and bulk storage 162.

The network interface 158 connects the client device 120-1 to the distributed computing system 100 via the distributed communications system 110. For example, the network interface 158 may include a wired interface (e.g., an Ethernet interface) and/or a wireless interface (e.g., a Wi-Fi, Bluetooth, near field communication (NFC), or other wireless interface). The network interface 158 connects the client device 120-1 to the distributed communications system 110 via a dongle 159, which is described below in detail. The memory 160 may include volatile or nonvolatile memory, cache, or other type of memory. The bulk storage 162 may include flash memory, a magnetic hard disk drive (HDD), and other bulk storage devices.

The processor 150 of the client device 120-1 executes an operating system (OS) 164 and one or more client applications 166. The client applications 166 include an application that accesses the servers 130 via the distributed communications system 110. For example, the client applications 166 may include mobile apps that the client devices 120 can use to interact with the ABETB-centric order matching system.

FIG. 5 shows a simplified example of the server 130-1. As mentioned above, the server 130-1 may implement the ABETB-centric order matching system. The server 130-1 typically includes one or more CPUs or processors 170, a network interface 178, memory 180, and bulk storage 182. In some implementations, the server 130-1 may be a general-purpose server and include one or more input devices 172 (e.g., a keypad, touchpad, mouse, and so on) and a display subsystem 174 including a display 176.

The network interface 178 connects the server 130-1 to the distributed communications system 110. For example, the network interface 178 may include a wired interface (e.g., an Ethernet interface) and/or a wireless interface (e.g., a Wi-Fi, Bluetooth, near field communication (NFC), or other wireless interface). The network interface 178 connects the server 130-1 to the distributed communications system 110 via a dongle 179, which is described below in detail. The memory 180 may include volatile or nonvolatile memory, cache, or other type of memory. The bulk storage 182 may include flash memory, one or more magnetic hard disk drives (HDDs), or other bulk storage devices.

The processor 170 of the server 130-1 executes an operating system (OS) 184 and one or more server applications 186, which may be housed in a virtual machine hypervisor or containerized architecture, which include the reward system 16. The bulk storage 182 may store one or more databases 188 that store data structures used by the server applications 186 to perform respective functions. For example, the server applications 186 may perform the functions of the ABETB-centric order matching system. The server applications 186 may include the methods shown and described below with reference to FIGS. 6-14. The databases 188 comprise the database 40 comprising the first and second data structures 50, 60 shown and described above with reference to FIGS. 1A, 1B, and 2. Thus, the one or more servers 130, the one or more server applications 186, the one or more databases 188 comprising the data structures 50, 60 collectively implement the ABETB-centric order matching system.

FIGS. 6-14 show various methods performed by the ABETB-centric order matching system implemented on the server 130. The methods describe the operations and functions of the ABETB-centric order matching system implemented on the server 130 using the server applications 186, which includes these methods, and using the databases 188, which include the database 40. The term control referenced in the methods below refers to the processor 170 of the server 130 shown and described above with reference to FIGS. 3-5, which executes the server applications 186 using the databases 188 and implements the ABETB-centric order matching system.

FIG. 6 shows a method 200 for automatically updating attributes of fungible assets according to the present disclosure. At 202, control generates a database comprising two data structures that allow automatically updating the attributes of the fungible assets according to the present disclosure. The two data structures include a first data structure and a second data structure. The first data structure stores the attributes of the fungible assets. The second data structure includes fields that are referentially related to the attributes of the fungible assets stored in the first data structure. For example, see the database 40 and the first and second data structures 50, 60 shown and described above with reference to FIGS. 1A-2.

At 204, control receives a stream of data regarding trades of one or more of the fungible assets over the network. At 206, control modifies one or more fields of the second data structure based on the stream of data received over the network. At 208, control automatically changes one or more of the attributes of the one or more fungible assets in the first data structure. The modification of one or more fields of the second data structure based on the received stream of data induces automatic changes to one or more attributes of the one or more fungible assets in the first data structure.

FIG. 7 shows a method 220 for maintaining a relative value equivalence of the fungible assets according to the present disclosure. At 222, control generates a database comprising two data structures that allow automatically updating the attributes of the fungible assets according to the present disclosure. The two data structures include a first data structure and a second data structure. The first data structure stores the attributes of the fungible assets. The second data structure includes fields that are referentially related to the attributes of the fungible assets stored in the first data structure. For example, see the database 40 and the first and second data structures 50, 60 shown and described above with reference to FIGS. 1A-2.

At 224, control receives a stream of data regarding trades of one or more of the fungible assets over the network. At 226, control modifies one or more fields of the second data structure based on the stream of data received over the network. At 228, control automatically changes/updates one or more of the attributes of the one or more fungible assets in the first data structure. The modification of one or more fields of the second data structure based on the received stream of data induces automatic changes to one or more attributes of the one or more fungible assets in the first data structure. At 230, control maintains a relative value equivalence of the fungible assets regardless of the trades.

Figure 8:
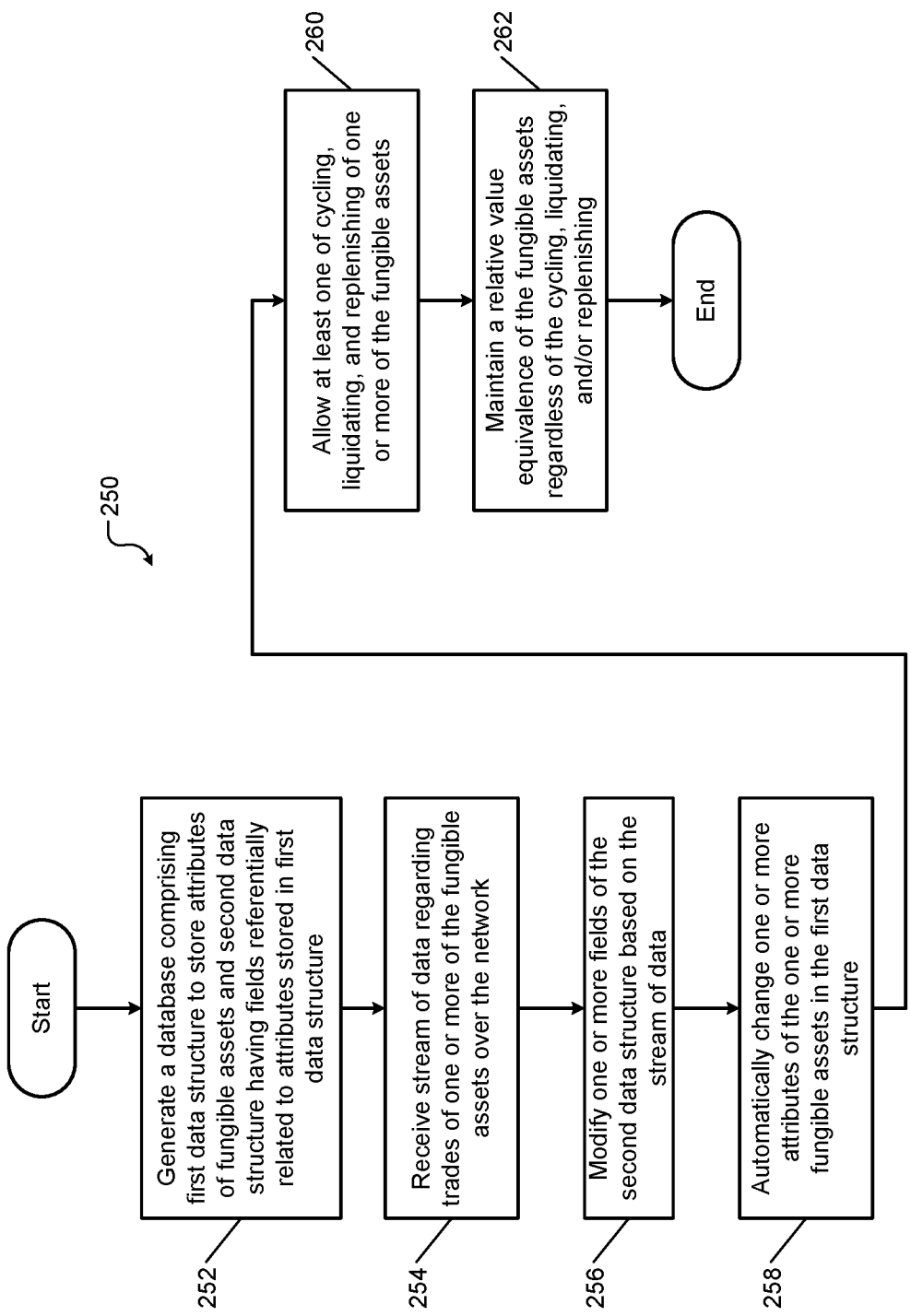
FIG. 8 shows a flowchart of a method performed by the ABETB-centric order matching system for maintaining a relative value equivalence of the fungible assets according to the present disclosure.

FIG. 8 shows a method 250 for maintaining a relative value equivalence of the fungible assets according to the present disclosure. At 252, control generates a database comprising two data structures that allow automatically updating the attributes of the fungible assets according to the present disclosure. The two data structures include a first data structure and a second data structure. The first data structure stores the attributes of the fungible assets. The second data structure includes fields that are referentially related to the attributes of the fungible assets stored in the first data structure. For example, see the database 40 and the first and second data structures 50, 60 shown and described above with reference to FIGS. 1A-2.

At 254, control receives a stream of data regarding trades of one or more of the fungible assets over the network. At 256, control modifies one or more fields of the second data structure based on the stream of data received over the network. At 258, control automatically changes one or more of the attributes of the one or more fungible assets in the first data structure. The modification of one or more fields of the second data structure based on the received stream of data induces automatic changes to one or more attributes of the one or more fungible assets in the first data structure.

At 260, control allows at least one of cycling, liquidating, and replenishing of one or more of the fungible assets. At 262, control maintains a relative value equivalence of the fungible assets regardless of the cycling, liquidating, and replenishing of one or more of the fungible assets.

FIG. 9 shows a method 300 for automatically updating attributes of fungible assets across a set of baskets (e.g., ABETB's) comprising the fungible assets according to the present disclosure. At 302, control maintains a set of baskets of fungible assets in a database. At 304, control generates in the database two data structures that allow automatically updating the attributes of the fungible assets according to the present disclosure. The two data structures include a first data structure and a second data structure. The first data structure stores the attributes of the fungible assets. The second data structure includes fields that are referentially related to the attributes of the fungible assets stored in the first data structure. For example, see the database 40 and the first and second data structures 50, 60 shown and described above with reference to FIGS. 1A-2.

At 306, control receives a stream of data regarding trades of one or more of the fungible assets over the network. At 308, control modifies one or more fields of the second data structure based on the stream of data received over the network. At 310, control automatically changes one or more of the attributes of the one or more fungible assets in the first data structure and across the set of baskets. The modification of one or more fields of the second data structure based on the received stream of data induces automatic changes to one or more attributes of the one or more fungible assets in the first data structure and across the set of baskets.

FIG. 10 shows a method 320 for matching buy and sell orders according to the present disclosure. At 322, control maintains a set of baskets (e.g., ABETB's) of fungible assets in a database. For example, see the database 40 and the first and second data structures 50, 60 shown and described above with reference to FIGS. 1A-2. At 324, control automatically updates one or more attributes of the one or more fungible assets across the baskets by using referential data structures in the database based on a stream of data received regarding trades of one or more of the fungible assets over the network. At 326, control receives buy and sell orders over the network from counterparties for trading one or more of fungible assets in the baskets. At 328, control matches the orders based on practically opposite rather than absolute opposite trading interests of the counterparties while maintaining a relative value equivalence the fungible assets in the baskets.

Figure 11:
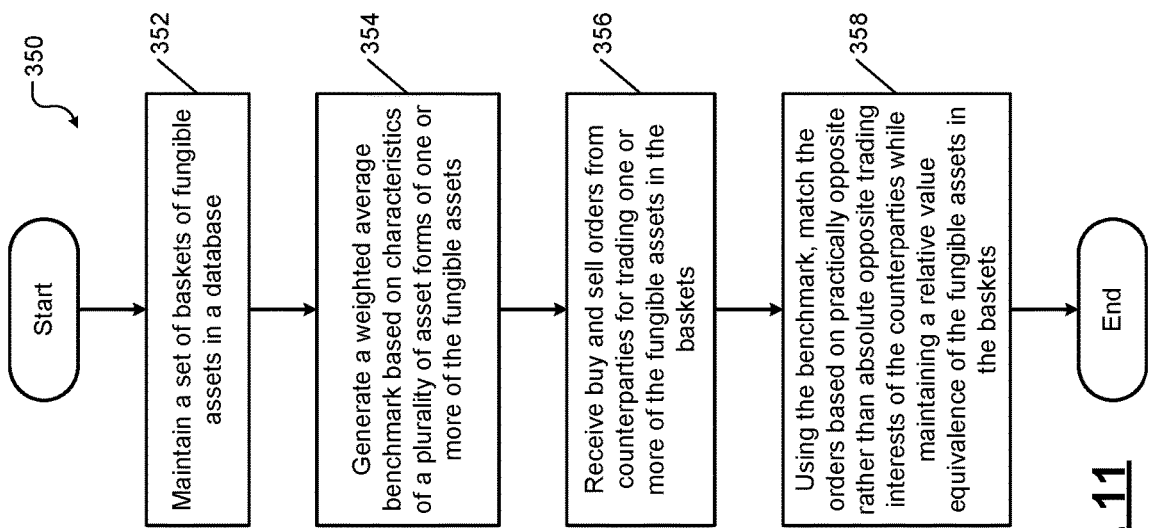
FIG. 11 shows a flowchart of a method performed by the ABETB-centric order matching system for generating a weighted average benchmark for matching buy and sell orders based on practically opposite rather than absolute opposite trading interests of counterparties according to the present disclosure.

FIG. 11 shows a method 350 for generating a weighted average benchmark for matching buy and sell orders based on practically opposite rather than absolute opposite trading interests of counterparties according to the present disclosure. At 352, control maintains a set of baskets (e.g., ABETB's) of fungible assets in a database. For example, see the database 40 and the first and second data structures 50, 60 shown and described above with reference to FIGS. 1A-2. At 354, control generates a weighted average benchmark based on characteristics of a plurality of asset forms of one or more of the fungible assets. At 356, control receives buy and sell orders over the network from counterparties for trading one or more of fungible assets in the baskets. At 358, using the benchmark, control matches the orders based on practically opposite rather than absolute opposite trading interests of the counterparties while maintaining a relative value equivalence the fungible assets in the baskets.

Figure 12:
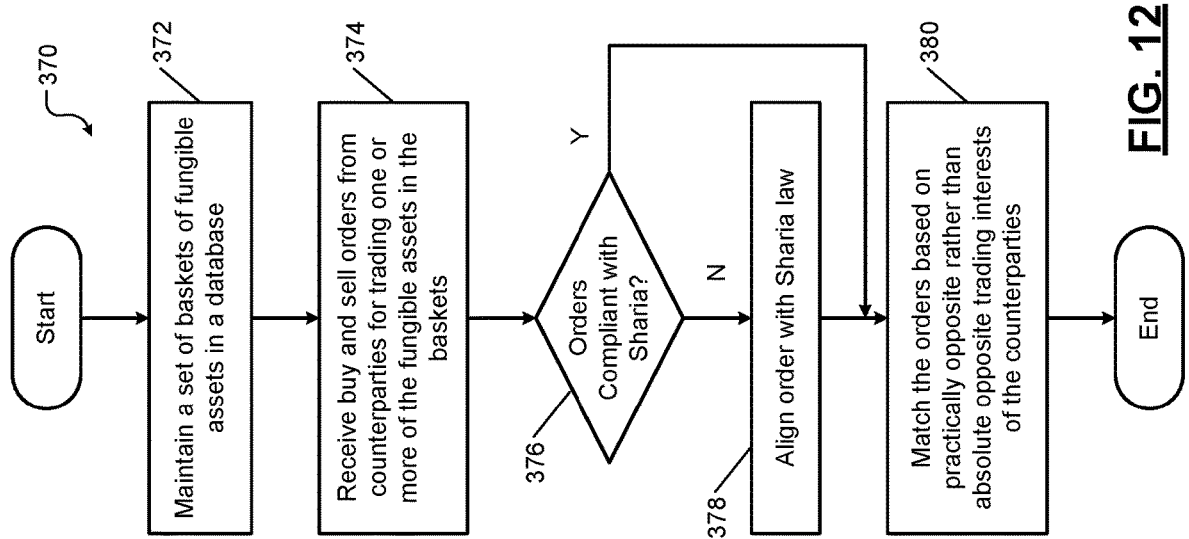
FIG. 12 shows a flowchart of a method performed by the ABETB-centric order matching system for ensuring that buy and sell orders comply with Sharia law according to the present disclosure.

FIG. 12 shows a method 370 for ensuring that buy and sell orders comply with Sharia law according to the present disclosure. At 372, control maintains a set of baskets (e.g., ABETB's) of fungible assets in a database. For example, see the database 40 and the first and second data structures 50, 60 shown and described above with reference to FIGS. 1A-2. At 374, control receives buy and sell orders over the network from counterparties for trading one or more of fungible assets in the baskets. At 376, control determines whether the buy and sell orders comply with the requirements of Sharia law. Control proceeds to 380 if the buy and sell orders comply with the requirements of Sharia law. If the buy and sell orders do not comply with Sharia law, at 380, control aligns the buy and sell orders with the requirements of Sharia law as described in detail in U.S. Pat. No. 10,269,070, which is incorporated herein by reference in its entirety. At 380, control matches the orders based on practically opposite rather than absolute opposite trading interests of the counterparties while maintaining a relative value equivalence the fungible assets in the baskets.

Figure 13:
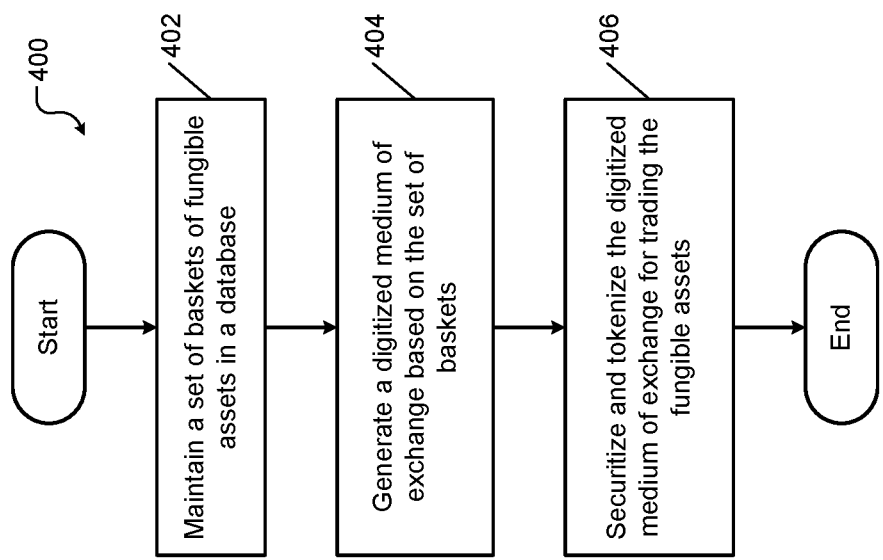
FIG. 13 shows a flowchart of a method performed by the ABETB-centric order matching system for generating, securitizing, to organizing a digitized medium of exchange for trading fungible assets according to the present disclosure.

FIG. 13 shows a method 400 for generating, securitizing, and tokenizing a medium of exchange for trading fungible assets according to the present disclosure. At 402, control maintains a set of baskets (e.g., ABETB's) of fungible assets in a database. For example, see the database 40 and the first and second data structures 50, 60 shown and described above with reference to FIGS. 1A-2. At 404, control generates a medium of exchange (e.g., ABMoE) based on the set of baskets of the fungible assets in the database and generates a digitized medium of exchange (e.g., DABMoE) therefrom. At 406, control securitizes and tokenize the digitized medium of exchange for trading the fungible assets.

Figure 14:
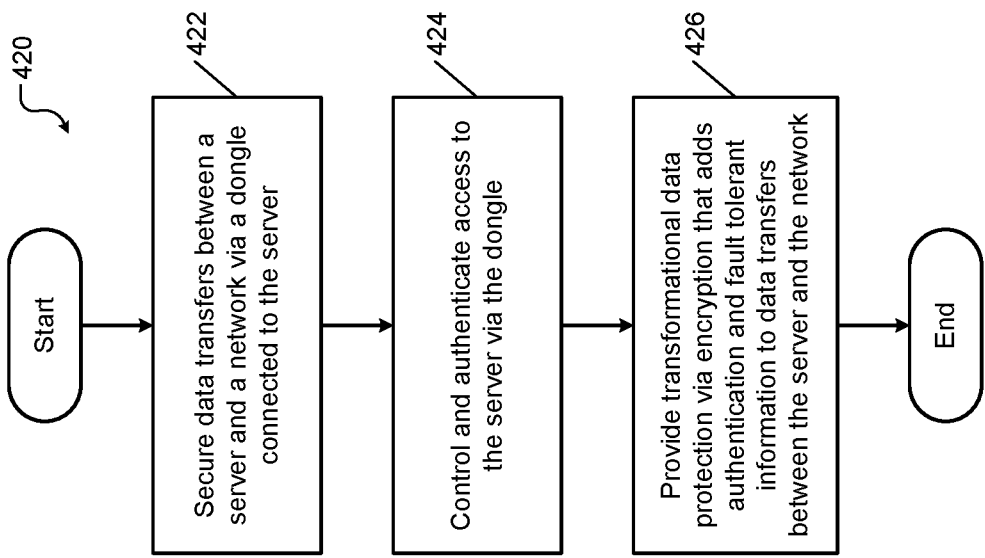
FIG. 14 shows a flowchart of a method performed by the ABETB-centric order matching system for providing secure transactions between devices used for trading fungible assets across a network according to the present disclosure.

FIG. 14 shows a method 420 for providing secure transactions between devices used for trading fungible assets across a network (e.g., element 110 shown in FIGS. 3-5) according to the present disclosure. Each device (e.g., a server 130 or client device 120 shown in FIGS. 3-5) on the network includes a dongle described herein and performs the method described herein. The dongle is described in detail in U.S. Pat. No. 10,269,070, which is incorporated herein by reference in its entirety. At 422, control secures data transfers between the device and the network via a dongle connected to the device. At 424, control authenticates access to the server via the dongle connected to the server. At 426, control provides transformational data protection via encryption that adds authentication and fault-tolerant information to data transfers between the server and the network.

FIG. 15 shows the multiple dimensions impacting data structures developed around BCS-based hybrid paradigm according to the present disclosure, which include the following: Physical assets (e.g., spots and forwards over conventional, Sharia-based and countertrade platforms); Financialized assets (e.g., futures and options over conventional exchange-traded derivatives platforms); Digitized assets (e.g., repos for asset financing; ABMoE for barter, and countertrade and other wholesale exchange-based settlements; and DABMoE for cryptocurrencies and other retail exchange-traded products); Order matching and execution directly over one exchange platform or via back-to-back order executions entailing multiple markets and platforms; and so on.

FIG. 16 shows the operations performed by an exchange 502 (i.e., by a server at the exchange 502; e.g., the server 130 shown in FIGS. 3-5) in an ABETB-centric order matching system 500 according to the present disclosure. The system 500 comprises the exchange 502 that allows trading of various assets according to the ABETB-centric order matching system 500 of the present disclosure. Examples of the assets include tradeable assets from authorized COI 504, tradeable assets from affiliated global e-Souks 506, tradeable assets from affiliated global e-counter 508, tradeable assets from affiliated global e-bourses 510, and tradeable assets from affiliated global e-credit 512. The exchange 502 segregates, manages, and controls asset inventories 514. Additional assets handled by the exchange include currencies including the U.S. dollar and other national currencies 516.

The exchange 502 generates ABETB (commodities) 518 and ABETB (credit instruments) 520 as described above. The ABETB (commodities) 518 includes commodity-based ETF's 522 tradeable in secondary markets. The ABETB (credit instruments) 520 includes credit-based ETF's 524 tradeable in secondary markets. The exchange 502 generates ABMoE 526 based on ABETB (commodities) 518 and ABETB (credit instruments) 520 as described above. The exchange 502 generates DABMoE 528 and WAB DABMoE 530 as described above.

The Exchange 502 formulates ABETB's 518, 520 for product offerings in their own right or as components of ABMoE 526, whereby baskets emulate BCS-based WAB Sets, each underpinned by a specified plurality of fungible assets having varying quantitative, qualitative, logistics and settlement timing properties. The exchange 502 acts cooperatively in an organization of Exchange Affiliates 506-512, their customers and respective CaI 504, with fully automated multi-faceted order matching systems employed by integrated computerized trading platforms to optimize organization-wide liquidity by cross-listing products and effectuating back-to-back order executions, as needed, to match practically opposite orders for qualifying assets in ABETB and related Managed and Controlled Inventories 514, all predicated on BCS.

The exchange 502 exercises constructive management and control over assets acquired and stored as inventories that can be used in the future to satisfy physical delivery commitments to ETD and other platforms affiliated with the exchange 502, including those assets qualified to underpin ABETB. The exchange 502 exercises constructive management and control over those qualified assets cycled in and out of ABETB and related inventories, in a manner that consistently maintains market value equivalence as practically, rather than absolute, opposite assets are interchanged based on BCS.

The exchange 502 continuously maintains a transactional database encompassing all Exchange and Affiliates' ETD contract market prices linked to cash-settled and physically-settled WAB's and Differential Indexes attendant to EFP spots and forwards, as well as futures, options and swaps. The exchange 502 employs algorithms to determine which Complementary and Forward Point Delivery Differential Indexes should be used to determine the extent to which cash adjustments must be paid or received as part of physically-settled spot, forward, and asset cycling transactions. The exchange 502 otherwise acts as a liquidity provider engaged in BCS-based order matching processes.

The following paragraphs specifically capture the features of the ABETB-centric order matching system according to the present disclosure. A computer implemented asset-backed Exchange-traded basket ("ABETB")-centric order matching system employing multifaceted "all-in" price discovery processes predicated on synergies derived from a Benchmark Complex Solutions ("BCS")-based hybrid paradigm formed to satisfy counterparties' practically, rather than absolute, opposite physical trading and hedging interests and create essential gains in multi-market liquidity over an integrated network of Exchange Affiliates' trading platforms engaged to cooperatively maintain contemporaneous ABETB-wide market value equilibrium as all cross-listed instruments attendant to the basket's underlying assets are continuously impacted by price movements throughout each trading day, wherein:

ABETB's are comprised of Exchange-specified baskets, emulating Weighted Average Benchmark ("WAB") Sets linked to Exchange-traded derivatives ("ETD"), in each case underpinned by a plurality of fungible assets having varying quantitative, qualitative, logistics and settlement timing properties whose respective impacts on relative asset value are transparently discoverable via BCS-based Differential Index ETD contracts, the requisite quantities of which are determined by computer implemented algorithms formulated to uniformly maintain equilibrium within the context of macro-level ABETB-wide price movements emulating the operative WAB's micro-level price movements;

customer orders posted throughout an organization of Exchange Affiliates are amalgamated to enhance practically opposite asset matching prospects benefitting spot market buying and selling, repurchase agreement ("repo") based financing, exchange-traded derivatives ("ETD") based hedging, and asset cycling-based basket replenishment drawing from the Exchange's segregated, managed and controlled inventories available to underpin ABETB, all of which together, provide synergistic multi-market gains in liquidity throughout the organization of Exchange Affiliates;

transparent gains in liquidity attendant to WAB's and Differential Indexes collectively support continuous streams of "all-in" market price discovery required to contemporaneously maintain relative value equivalence for each qualifying asset among those underpinning an ABETB, and the contents of Exchange managed and controlled inventories, iterative processes incenting counterparty migration toward settling even larger volumes and wider swaths of orders throughout all Exchange Affiliates by physical delivery and receipt; and all essential aspects of multifaceted ABETB-centric order matching are computer implemented to occur cooperatively over trading platforms unique to an organization of Affiliated Exchanges, their customers and respective communities of interest ("COI") via integrated cloud-powered, cryptographically-assured and dongle-enabled Exchange-controlled networks ("ECN's") and customized permissioned ledgers ("CPL's") dealing with a diverse range of fungible-yet-varying individual assets, ABETB's and Asset-Backed Mediums of Exchange ('ABMoE") cross-listed via physical (i.e., spots and forwards), financialized (i.e., futures and options), securitized (i.e., repos) and tokenized (i.e., cryptocurrency) product offerings in primary and secondary markets.

In the ABETB-centric order matching system, the BCS-based counterparty matching comprises one or more Exchange Affiliates configuring weighted average benchmark ("WAB") sets, with each set linked to an Exchange-specified plurality of qualifying asset forms, rather than arbitrarily denoting one single asset form as the benchmark for all forms of that asset. The BCS-based counterparty matching comprises one or more Exchange Affiliates identifying and factoring impact of quantitative, qualitative, logistics and settlement timing properties unique to each of the qualifying asset forms serving as a basis of a neutral WAB formulated by the Exchange for an entirety of the set.

Additionally, the BCS-based counterparty matching comprises one or more Exchange Affiliates providing a uniform method of allowances for incidences where traders own or are seeking to own varying yet interchangeable physical asset forms, each qualified as a component of an Exchange-specified set, and to offer or bid their specific asset form pursuant to standardized spot or forward EFP contracts requiring settlement by physical delivery or receipt of their respective underlying assets, with each contract's specifications linked to an operative WAB formulated by the Exchange to cover an entire set of qualified asset forms.

Further, the BCS-based counterparty matching comprises one or more

Exchange Affiliates ensuring that each component in a WAB provides quantitative characteristics, plus varying qualitative, logistics and settlement timing properties customarily adding to or detracting from such asset's market value, net aggregate effects of which are balanced Exchange-wide by methods comprised of the following.

establishing benchmark-specific WAB sets, each formulated for incorporation into a family of standardized ETD contracts, including spots, forwards, futures, options and spreads, specifications of which differ only by timing and type of settlement taking place;

requiring EFP spot and forward traders to acquire an algorithm-specified number of long or short Complementary Differential Index contracts in exchange for cash paid or received, as the case may be, with said contracts linked to varying qualitative and/or logistics attributes of the underlying assets delivered or received, respectively, and to ensure co-delivery of such contracts as of an operative EFP physical delivery date;

requiring EFP spot and forward traders to acquire an algorithm-specified number of long or short Forward Point Delivery Differential Index contracts in exchange for cash paid or received, said contracts linked to negotiated timing of underlying assets delivered or received, respectively, and to ensure co-delivery of such contracts as of an operative EFP physical delivery date; and uniformly employing the forgoing to specify, acquire, finance, store as inventory, and hedge tradable assets underpinning ABETB on a practically equivalent basis, culminating in cycled interchange of varying-yet-fungible assets qualified within ABETB to reflect the impact of qualitative, logistical, supply chain and life cycle factors unique to assets being stored and, when necessary, securitized and/or tokenized prior to the Exchange(s) meeting future delivery commitments to counterparties, thereby ensuring their ongoing role as ETD liquidity provider(s) pursuant to float process guidelines within an affiliated Exchange organization-wide inventory management and control system.

In the ABETB-centric order matching system, the ECN is controlled by an Exchange. The ECN comprises a host server controlled by the Exchange. The host server is located at a first location. The ECN comprises a plurality of front-end virtual servers communicating with the host server; located at a plurality of locations, respectively; assigned to communities of interest ("COI") authorized by the host server; and authenticated by the host server to cryptographically validate, process, transmit, and receive pre-approved digital information passed along the ECN without using intermediaries.

The ECN comprises a plurality of dongles operating in conjunction with the respective front-end virtual servers and performing the functions comprising the following: controlling access by the front-end virtual servers to the ECN and controlling availability and storage of digital data on the front-end virtual servers; enabling the front-end virtual servers to cryptographically authenticate, post and confirm buy and sell orders for trades ultimately matched, executed, cleared, settled and reported by the host server contemporaneously over the ECN in compliance with policies and rules established by the host server, and without using intermediaries; and facilitating transformational data protection via encryption that adds authentication and fault tolerant information to the digital data.

The host server comprises a processor and memory storing machine executable instructions which when executed by the processor perform the following functions: collecting data for a plurality of tradable assets, the data including parameters accounting for qualitative, logistical, supply chain, life cycle settlement timing factors unique to the tradable assets; selecting assets from the tradable assets based on the parameters; generating, based on the selection, sets of tradable assets underlying ABETB's; generating weights based on a rate denoting estimated global commercial value of a selected tradable asset relative to aggregate estimated global commercial value of all tradable assets underlying the ABETB; generating, using the weights, weighted averages for the ABETB's; generating specifications for tradable asset baskets based on aggregate weighted averages of the selected tradable assets in a weighted average ABETB; communicating specifications for ABETB to customers and their COI; collecting, generating and communicating, as noted above, for ABMoE comprising sets of ABETB; and receiving orders for tradable assets, ABETB and ABMoE from traders and other parties via the ECN.

The host server comprises a back-to-back execution module that reserves a portion of gross segregated tradable asset inventories on hand for each type of asset, the portion optimizing: efficiency of the host server in matching practically, rather than absolutely, the bilateral trading interests of its Exchange Affiliates' counterparties to physically settle their outstanding derivatives orders over a projected future time frame; and ability of the host server to substitute different varying-yet-fungible and cyclable tradable asset forms while managing individual traded assets, ABETB and ABMoE.

In the ABETB-centric order matching system, the tradable assets comprise at least one of the following types: any commodity produced for global consumption and having varying quality, logistics and settlement timing properties or attributes that impact a market place value of the asset; any credit or other financial instrument having varying quality, logistics and settlement timing properties or attributes that impact a market place value of the instrument; any national currency; and any other tradable asset that is subject to the terms of barter or countertrade transaction executed over an Exchange Affiliate's barter and countertrade platform.

In the ABETB-centric order matching system, the host server: updates the collected data periodically; updates the Exchange's specification for tradable assets, ABETB and ABMoE based on the collected and updated data; communicates specifications for tradable assets, ABETB and ABMoE to Exchange customers and their COI; works in cooperation with back-to-back execution module to acquire tradable assets from Exchange members including but not limited to asset producers, trading companies, financial institutions and investors, with such acquisitions transacted over the host server via cash payments, issuance of one or more Exchange memberships, issuance of ABETB and/or ABMoE ownership interests; and works in cooperation with back-to-back execution module to acquire, segregate, manage and control inventories of qualifying tradable assets for purposes of replenishing ABETB's while satisfying the diverse needs of all Exchange and Affiliates counterparties' spot and forward physically-settled trading interests.

In the ABETB-centric order matching system, the ECN is in communication with at least one of a wide area network and the Internet. The ECN further comprises a server in communication with a computing device used by the COI via the at least one of the wide area network and the Internet.

In the ABETB-centric order matching system, the ABETB's are single asset baskets designed to emulate WAB Sets linked to Exchange-specified fungible-yet-varying assets, wherein each asset in an ABETB is uniformly valued "all in" at the operative WAB Set market price±adjustments linked to market prices transparently discovered in connection with cash-settled Complementary and Forward Point Delivery Differential Indexes applicable under the circumstances.

The ABETB's are sets of single asset baskets comprising more diversified offerings, such as the ABMoE developed for barter and countertrade platform disclosed in U.S. Pat. No. 9,460,470, and upon being securitized and tokenized, Digitized ABMoE formulated to inter alia provide secondary cryptocurrency markets with substantive alternatives to Bitcoin and altcoins in the field.

The ABETB's are structured to allow each of a single asset basket's contents to be cycled in and out in exchange for other basket qualifiers as part of a system that practically, rather than absolutely, offsets their respective equivalent values by adjusting the prevailing market price of an operative WAB Set higher or lower to uniformly reflect the impact of applicable Differential Indexes' market prices, each and all of the aforementioned prices discovered continuously each trading day over transparent computerized trading platforms serving an organization of Affiliated Exchanges via integrated ECN and CPL, as elucidated in U.S. Pat. Nos. 9,002,741, 9,460,470, 10,269,070, and 10,515,115.

In the ABETB-centric order matching system, a back-to-back execution module amalgamates all Exchange Affiliates' customer bids and offers for ultimate execution at the host server pursuant to a cross-liquidity process factoring order flow of each Exchange trading platform and triggers, when necessary, back-to-back executions satisfying the needs of an ABETB that is being formulated for trading or replenished, whereby: the Exchange becomes a counterparty to the ABETB's required bid or offer; and the host server then posts an offsetting offer or bid of the Exchange, which upon processing by the back-to-back execution module becomes a committed component of the ABETB or Exchange managed and controlled inventories segregated for the sake of providing future liquidity satisfying the needs of all products cross-listed within the organization of Affiliated Exchanges.

In the ABETB-centric order matching system, the host server employs inventory management and control systems supporting gross and net segregated tradable assets qualified for present and future inclusion in an ABETB, with such systems employing at least private and public warehouse receipts and shipping certificates that can be reconciled with all tradable assets underpinning the ABETB's present and future composition.

In the ABETB-centric order matching system, the authorized COI includes at least one of: wholesale commercial and speculator customers of the Exchange; introducing brokers; non-clearing commercial merchants; clearing members of the Exchange or its Exchange Affiliates; non-clearing members of the Exchange or its Exchange Affiliates; one or more tradable asset inventory control and logistics service providers authorized by the host server; one or more tradable asset securitization and/or tokenization service providers authorized by the host server; one or more clearinghouses either affiliated with the Exchange or independently contracted; one or more trade reporting service firms; and one or more independent regulatory bodies charged with oversight responsibility in connection with the conduct of the Exchange's trading markets.

The ABETB-centric order matching system comprises counterparty matching processes for affiliated computerized trading platforms dealing with commodities, each qualified as a member of an Exchange-formulated basket of varying-yet-fungible commodity forms comprising an ABETB that can be offered as an alternative to certain conventional ETF's and other financial products. The trading party types are denoted by each respective party at its dongle-enabled sign-in, including the following: Commodity Producers (Sellers) as wholesale customers of the Exchange; Commodity Users (Buyers) as wholesale customers of the Exchange; Exchange Market Makers (covering Buy and Sell sides), including those that are clearing and non-clearing members of the Exchange; Commodity Trading Firms (covering Buy and Sell sides), including those that are clearing and non-clearing members of the Exchange; and Global d-Bourse (covering Buy and Sell sides), on behalf of the Exchange, cooperatively engaging with Affiliated Exchanges to perform the following functions:

formulate WAB Sets specified for each ABETB and ABMoE; enhance Exchange affiliate-wide liquidity by cross-listing ABETB products over multiple platforms to effectuate back-to-back order executions; exercise constructive management and control over assets acquired and stored prior to their use to satisfy physical delivery commitments to ETD and other trading platforms in the affiliated Exchange organization, including assets underpinning ABETB; exercise constructive management and control over assets cycled in and out of ABETB in a manner that contemporaneously maintains "all-in" market value equivalence for each qualifying asset while practically, rather than absolutely, opposite assets are interchanged; maintaining a transactional data base encompassing "all-in" bids and offers attendant to cash-settled and physically-settled ETD contract market prices, Exchange Affiliate-wide, including EFP spots and forwards, futures, options and swaps linked to an operative WAB, and factoring the impact of BCS-based algorithms directing the extent to which Complementary and Forward Point Delivery Differential Indexes should be acquired for cash adjustments paid or received as part of asset cycling transactions; and otherwise acting as a liquidity provider engaged in BCS-based order matching processes.

The ABETB-centric order matching system comprises matching processes to fill commodity buy-side orders (iterative until a match is executed). Commodity User posts "all-in" bid data for specific commodity form (the "CUspCF") that qualifies within a plurality of forms comprising an operative Exchange-formulated WAB Set underpinning an ABETB, with said bid data indicating desired quantity, incoterms and price, as well as Exchange confirmation that Commodity User is logistically and financially qualified to take delivery of the denoted commodity pursuant to the terms of its bid. Exchange compares Commodity User's "all-in" bid data with all-in offer data posted by Sellers, in this case, primarily Commodity Producers, Exchange Market Makers, and Commodity Trading Firms, aimed at identifying whether an absolute matching offer exists to offset against Commodity User's bid.

If no absolute matching offer (per above) emerges, Exchange inquires with Global d-Bourse to see if it is willing to sell CUspCF inventory in its possession to the Commodity User, a decision Global d-Bourse makes after determining the extent to which: required quantity of CUspCF is physically available and uncommitted pursuant to Global d-Bourse Inventory Management and Control Guidelines; and different yet practically equivalent form(s) of the commodity, also qualifying in the operative WAB Set's plurality, can be acquired to replace the CUspCF at an all-in value (i.e., amounting to prevailing market price of operative WAB set±adjustments for prevailing market prices of applicable Differential Indexes) acceptable to Global d-Bourse.

If the forgoing process still fails to result in an absolute match, Exchange informs Commodity User whether: matching "all-in" offer(s) for the CUspCF are posted, albeit at higher selling price(s), by one or more of the aforementioned Sellers; or different yet practically equivalent form(s) of the desired commodity, also qualified as a component in the WAB Set's specified plurality, are available in the quantity sought and at an "all-in" prevailing market price equivalent to that originally sought by the Commodity User with respect to CUspCF.

The ABETB-centric order matching system comprises matching processes to fill sell-side orders (iterative until a match is executed). Commodity Producer posts "all-in" offer data for a specific commodity form (the "CPspCF") that qualifies within a plurality of forms comprising an operative Exchange-formulated WAB Set, with said data indicating desired quantity, incoterms and price, as well as Exchange confirmation that the Commodity Producer is operationally, logistically and financially qualified to make delivery of the denoted commodity pursuant to the terms of its offer. Exchange compares Commodity Producer's "all-in" offer data with bid data posted by Buyers, in this case, primarily Commodity Users, Exchange Market Makers, and Commodity Trading Firms aimed at identifying whether bid(s) can be absolutely matched with Commodity Producer's offer.

If no absolute matching bid (per above) emerges, Exchange inquires with Global d-Bourse to see if it is willing and able to buy CPspCF from the Commodity Producer for inclusion as part of tradable asset inventories under its constructive control, a decision Global d-Bourse makes pursuant to its Inventory Management and Control Guidelines. If the forgoing process still fails to result in an absolute match, Exchange informs Commodity Producer whether matching bid(s) for the CPspCF have been posted, albeit at lower "all-in" price(s), by one or more of the aforementioned Buyers.

The ABETB-centric order matching system comprises counterparty matching processes integral to affiliated Exchanges' computerized trading platforms employing BCS within an ECN customized to facilitate use of permissioned ledgers, all linked to pluralities of fungible credit instruments qualifying to underpin an ABETB that emulates an Exchange-formulated WAB Set, factoring such quantitative attributes as bond classifications, such as corporate industrials, transports, utilities and financial services, and various types of preferred stocks, leveraged loans, municipals and even Sharia-based Sukuks, and varying qualitative attributes, such as coupon rate of interest, credit quality rating, remaining time to maturity, convertibility and callability, each incorporated into an operative WAB integrated with Complementary Differential and Forward Point Delivery Differential Indexes.

The trading party types denoted for each respective party at its dongle-enabled sign-in include: Buyers of physically-settled spot and forward ETD contracts linked to individual credit instruments that qualify as components of an Exchange-formulated WAB Set; Buyers of physically-settled spot and forward ETD contracts linked to an ABETB, qualifying as a component within a plurality underpinning an ABMoE; Sellers of either of the forgoing; Exchange market makers covering both buy and sell sides; and Global d-Bourse covering both buy and sell sides.

The ABETB-centric order matching system comprises processes to fill buy side orders (iterative until a match is executed). Buyer posts "all-in" bid data for a specific credit instrument qualifying as a component of ABETB emulating an Exchange-formulated WAB Set, with said bid data including desired quantitative and qualitative properties and price. Exchange compares Buyer's "all-in" bid data with "all-in" offer data posted by Sellers for the same credit instrument, including offers by Exchange Market Makers, aimed at identifying whether an absolute matching offer exists.

If no absolute matching offer (per above) emerges, Exchange inquires with Global d-Bourse to see if it is willing and able to sell the same credit instrument from inventory in its constructive possession to the Buyer at the "all-in" bid price, a decision Global d-Bourse makes after determining whether: required quantity of the asset desired by Buyer is physically available and uncommitted per Global d-Bourse Inventory Management and Control Guidelines; and practically equivalent alternative credit instruments also qualifying within attendant WAB Set's plurality can be acquired, at satisfactory prevailing "all-in" market prices, to replace the credit instruments removed from Global d-Bourse's inventory.

If above process still fails to result in absolute match, Exchange informs Buyer whether: matching offer(s) for the desired asset is posted, albeit at higher "all-in" selling price(s), by one or more of the aforementioned Sellers; or practically equivalent form(s) of the desired asset, qualifying within the WAB Set's specified plurality, are available in the quantity and at a prevailing "all-in" market price equivalent to what was originally sought by the Buyer.

The ABETB-centric order matching system comprises processes to fill sell side orders (iterative until a match is executed). Seller posts "all-in" offer data for a specific credit Instrument security that is a qualified component of an ABETB emulating an Exchange-formulated WAB Set, with said data including desired quantitative and qualitative properties and price. Exchange compares Seller's "all-in" offer data with "all-in" bid data posted by Buyers, including Exchange Market Makers, aimed at identifying whether absolutely matching bid(s) exist.

If no absolute matching bid (per above) emerges, Exchange inquires with Global d-Bourse to see if it is willing and able to buy said securities from the Seller for inclusion as part of tradable asset inventories under its constructive control, a decision Global d-Bourse makes pursuant to its Inventory Management and Control Guidelines. If the forgoing process still fails to result in absolute match, Exchange informs Seller whether any matching bid(s) for the credit instruments have been posted, albeit at lower price(s), by one or more of the aforementioned Buyers.

In the ABETB-centric order matching system, an order for derivatives contracts based on differences between actual properties of the tradable asset to be physically delivered under the terms of an operative derivatives contract and the aggregate qualities indicated by an operative tradable asset benchmark is processed by a computer implemented algorithm employed to compute the requisite number of long or short Complementary Differential Index-based contracts valuing attendant tradable asset quality or logistics variability, with said contracts being executable for co-delivery on the operative derivatives contract's settlement date.

In the ABETB-centric order matching system, the processor 170 uses the computer implemented algorithm to compute the requisite number of co-deliverable long or short Complementary Differential Index-based contracts, in accordance with operations employing program logic summarized below. First, the algorithm identifies the extent of a traders open long position, which is the commitment to take physical delivery of Exchange-qualified tradable asset, or the trader's short position, which is the commitment to physically deliver the Exchange-qualified tradable asset, in the operative derivatives contract, each said operative derivatives contract being denominated in a standard unit of volume.

Next, the algorithm multiplies the trader's identified open long or short derivatives contract position by a factor, related to the standard unit of volume, which is a predetermined number, times the difference between the tradable asset's quality or logistics level specified in the operative tradable asset benchmark and the actual level contained in the tradable asset to be physically received or delivered; upon solving that equation the algorithm determines the extent to which the trader must buy or sell Complementary Differential Index contracts based on the factors described as follows:

Long traders with differentials where the benchmark level is greater (i.e., more valuable) than the actual level contained in the tradable asset to be received must sell Complementary Differential Index contracts; conversely, long traders with differentials where the benchmark level is less than the actual level contained in the tradable asset to be received must buy Complementary Differential Index contracts.

Short traders with differentials where the benchmark quality or logistics level is greater (i.e., more valuable) than the actual quality level contained in the tradable asset to be delivered must buy Complementary Differential Index contracts; conversely, short traders with differentials where the benchmark quality or logistics level is less than the actual quality level contained in the tradable asset to be delivered must sell Complementary Differential Index contracts.

The algorithm multiplies the trader's identified open long or short derivatives contract by a factor, related to the standard unit of volume, which is a predetermined number, time the difference between the quality or logistics level specified in the operative tradable asset benchmark and the actual level contained in the tradable asset to be physically received or delivered; once that equation is solved, the algorithm determines the extent to which the trader must buy or sell Complementary Differential Index contracts based on the factors described as follows.

Long traders with differentials where the benchmark level is greater, that is less valuable, than the actual level contained in the tradable asset to be received, must buy Complementary Differential Index contracts; conversely, long traders with differentials where the benchmark level is less than the actual level contained in the tradable asset to be received must sell Complementary Differential Index contracts.

Short traders with differentials where the benchmark level is greater, that is less valuable, than the actual level contained in the tradable asset to be delivered, must sell Complementary Differential Index contracts; conversely, short traders with differentials where the benchmark level is less than the actual level contained in the tradable asset to be delivered must buy Complementary Differential Index contracts.

In the ABETB-centric order matching system, the Exchanges assist their counterparties via pop-up screens (e.g., graphic user interfaces) that provide information concerning what the algorithm-derived bid or offer price would be based on the last published executed trades for each of their desired pair contracts, and then gives each counterparty the ability to place an order based on that Exchange-supplied price information or another price independently selected by the counterparty.

The ABETB-centric order matching system is configured to process orders for Forward Point Delivery Differential Index derivatives contracts based on differences between the actual, desired date for the tradable asset to be delivered under the terms of an operative derivatives contract and the date indicated by an operative tradable asset benchmark, wherein the orders are processed by a processor using an algorithm employed to compute the requisite number of long or short Forward Point Delivery Differential Index-based contracts valuing the tradable asset's forward point delivery variability, with said contracts being structured for co-delivery as of the operative derivatives contract's settlement date.

In the ABETB-centric order matching system, the processor 170 uses the algorithm to compute the requisite number of co-deliverable long or short complementary Forward Point Delivery Differential Index derivatives contracts, in accordance with operations employing program logic summarized below. First, the processor 170, using the algorithm, identifies the extent of a trader's open long position, which is a commitment to take physical delivery of exchange-qualified tradable asset, or short position, which is a commitment to physically deliver exchange-qualified tradable asset, in the operative derivatives, and wherein the operative derivatives contract is also known as the underlying EFP contract, and wherein each said operative derivatives contract is denominated in the standard unit of volume.

Next, the processor, using the algorithm, multiplies the trader's identified open long or short underlying EFP contract position by the number of trading days forward differing between the delivery date specified in the operative tradable asset benchmark and the actual, desired date specified by the trader for the tradable asset to be physically received or delivered under the underlying EFP contract; upon solving that said equation, the algorithm determines the extent to which traders must buy or sell Forward Point Delivery Differential Index contracts based on the factors described as follows:

Long traders experiencing a contango condition in their underlying EFP contract's market, that is where forward prices exceed spot prices, must buy complementary Forward Point Delivery Differential Index contracts; conversely, long traders experiencing a backwardation condition in their underlying EFP contract's market, that is where spot prices exceed forward prices, must sell Forward Point Delivery Differential Index contracts. Short traders experiencing a contango condition in their underlying EFP contract's market must sell Forward Point Delivery Differential Index contracts. Conversely, short traders experiencing a backwardation condition in their underlying EFP's market must buy Forward Point Delivery Differential Index contracts.

In the ABETB-centric order matching system, the Exchange continuously provides prevailing "all-in" market values attributable to each tradable asset underpinning an ABETB and imputes cumulative ABETB market values, as well as cumulative ABMoE market values, by computing the sum of those underpinnings, including effects of net cash paid or received to acquire all Differential Index contracts, applicable thereto, processes which negate (or circumvent) the need to employ a conventional multi-basket ETF structure encompassing creation, redemption and holding baskets, respectively, each specifying different assets, and Authorized Parties ("AP's") that provide liquidity whenever there is an imbalance of buy and sell orders for ETF shares selling at a premium or discount to the ETF's net asset value computed at the end of each trading day by the ETF's Fund Manager.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A server connected to a network, the server comprising:
a processor; and
memory storing instructions which when executed by the processor configure the processor to:
generate a database comprising:
a first data structure configured to store attributes of fungible assets, the attributes determining market values of the fungible assets, wherein the attributes include an asset type, valuation data, and geographic data of the fungible assets; and
a second data structure having fields referentially related to the attributes stored in the first data structure such that a change in any one of the fields induces a change in real time in a corresponding one of the attributes in the first data structure;
receive a stream of data regarding one or more of the attributes of the fungible assets from the network;
modify one or more of the fields of the second data structure based on the stream of data received from the network;
allow at least one of cycling, liquidating, and replenishing of one or more of the fungible assets associated with the first data structure based on the modified one or more fields of the second data structure; and
maintain a relative value equivalence of the fungible assets based on the at least one of cycling, liquidating, and replenishing of the one or more of the fungible assets associated with the first data structure,
wherein the first data structure is automatically updated in real time as the stream of data modifies the one or more of the fields of the second data structure, and wherein the updating of the first data structure automatically updates the attributes and valuations of the fungible assets in real time.

2. The server of claim 1 wherein the stream of data is based on trading activity associated with the one or more of the fungible assets over the network.

3. The server of claim 1 wherein the instructions further configure the processor to maintain a plurality of baskets of the fungible assets in the database, and wherein modifying the one or more of the fields of the second data structure automatically updates the attributes and valuations of the fungible assets across the baskets in real time.

4. The server of claim 3 wherein the instructions further configure the processor to receive via the network buy and sell orders from counterparties for trading one or more of the fungible assets in the baskets and to match the orders based on practically opposite rather than absolute opposite trading interests of the counterparties while maintaining the relative value equivalence of the fungible assets in the baskets.

5. The server of claim 4 wherein the instructions further configure the processor to generate a weighted average benchmark based on a plurality of asset forms of one or more of the fungible assets and to match the orders using the weighted average benchmark.

6. The server of claim 4 wherein the instructions further configure the processor to provide liquidity and physical delivery of the traded fungible assets to the counterparties via the network upon matching the orders while maintaining the relative value equivalence of the fungible assets in the baskets.

7. The server of claim 4 wherein the instructions further configure the processor to align the orders to comply with Sharia law.

8. The server of claim 1 wherein the instructions further configure the processor to generate a digitized medium of exchange that is based on a set of baskets comprising the fungible assets and that is usable for trading the fungible assets over the network.

9. The server of claim 8 wherein the instructions further configure the processor to securitize and tokenize the digitized medium of exchange for trading the fungible assets over the network.

10. The server of claim 1 further comprising a dongle that cryptographically authenticates access to the server via the network and that secures data transfers between the server and the network.

11. The server of claim 1 further comprising a dongle that provides transformational data protection via encryption that adds authentication and fault tolerant information to data transfers between the server and the network.

12. A method comprising:
generating a database on a server, the database comprising:
a first data structure configured to store attributes of fungible assets, the attributes determining market values of the fungible assets, wherein the attributes include an asset type, valuation data, and geographic data of the fungible assets; and
a second data structure having fields referentially related to the attributes stored in the first data structure such that a change in any one of the fields induces a change in real time in a corresponding one of the attributes in the first data structure;
receiving a stream of data regarding one or more of the attributes of the fungible assets at the server from a network;
modifying one or more of the fields of the second data structure based on the stream of data received from the network;
automatically updating the first data structure in real time as the stream of data modifies the one or more of the fields of the second data structure; and
automatically updating, based on the updating of the first data structure, the attributes and valuations of the fungible assets in real time;
allowing at least one of cycling, liquidating, and replenishing of one or more of the fungible assets associated with the first data structure based on the modified one or more fields of the second data structure; and
maintaining a relative value equivalence of the fungible assets based on the at least one of cycling, liquidating, and replenishing of the one or more of the fungible assets associated with the first data structure.

13. The method of claim 12 further comprising receiving the stream of data in response to trading activity associated with the one or more of the fungible assets over the network.

14. The method of claim 12 further comprising:
maintaining a plurality of baskets of the fungible assets in the database; and
automatically updating, based on the modifying of the one or more of the fields of the second data structure, the attributes and valuations of the fungible assets across the baskets in real time.

15. The method of claim 14 further comprising:
receiving, at the server via the network, buy and sell orders from counterparties for trading one or more of the fungible assets in the baskets; and
matching, at the server, the orders based on practically opposite rather than absolute opposite trading interests of the counterparties while maintaining the relative value equivalence of the fungible assets in the baskets.

16. The method of claim 15 further comprising:
generating a weighted average benchmark based on a plurality of asset forms of one or more of the fungible assets; and
matching the orders using the weighted average benchmark.

17. The method of claim 15 further comprising providing liquidity and physical delivery of the traded fungible assets to the counterparties via the network upon matching the orders while maintaining the relative value equivalence of the fungible assets in the baskets.

18. The method of claim 15 further comprising aligning the orders to comply with Sharia law.

19. The method of claim 12 further comprising generating, at the server, a digitized medium of exchange that is based on a set of baskets comprising the fungible assets and that is usable for trading the fungible assets over the network.

20. The method of claim 19 further comprising securitizing and tokenizing, at the server, the digitized medium of exchange for trading the fungible assets over the network.

21. The method of claim 12 further comprising cryptographically authenticating access to the server via the network and securing data transfers between the server and the network by using a dongle coupled to the server.

22. The method of claim 12 further comprising providing transformational data protection via encryption and adding authentication and fault tolerant information to data transfers between the server and the network by using a dongle coupled to the server.

23. A server connected to a network, the server comprising:
a processor; and
memory storing instructions which when executed by the processor configure the processor to:
generate a database comprising:
a first data structure configured to store attributes of fungible assets, the attributes determining market values of the fungible assets, wherein the attributes include an asset type, valuation data, and geographic data of the fungible assets; and
a second data structure having fields referentially related to the attributes stored in the first data structure such that a change in any one of the fields induces a change in real time in a corresponding one of the attributes in the first data structure;
receive a stream of data regarding one or more of the attributes of the fungible assets from the network;
modify one or more of the fields of the second data structure based on the stream of data received from the network;
allow at least one of cycling, liquidating, and replenishing of one or more of the fungible assets associated with the first data structure based on the modified one or more fields of the second data structure; and
maintain a relative value equivalence of the fungible assets based on the at least one of cycling, liquidating, and replenishing of the one or more of the fungible assets associated with the first data structure,
wherein the first data structure is automatically updated in real time as the stream of data modifies the one or more of the fields of the second data structure, and wherein the updating of the first data structure automatically updates the attributes and valuations of the fungible assets in real time; and
wherein the instructions further configure the processor to maintain a plurality of baskets of the fungible assets in the database, and wherein modifying the one or more of the fields of the second data structure automatically updates the attributes and valuations of the fungible assets across the baskets in real time.

* * * * *